United States Patent
Briscoe et al.

(10) Patent No.: US 8,498,210 B2
(45) Date of Patent: Jul. 30, 2013

(54) CONTROL OF DATA IN A NETWORK

(75) Inventors: Robert J Briscoe, Woodbridge (GB); Arnaud Jacquet, Ipswich (GB)

(73) Assignee: British Telecommunications plc, London (GB)

( * ) Notice: Subject to any disclaimer, the term of this patent is extended or adjusted under 35 U.S.C. 154(b) by 743 days.

(21) Appl. No.: 11/795,948

(22) PCT Filed: Jan. 31, 2006

(86) PCT No.: PCT/GB2006/000330
§ 371 (c)(1),
(2), (4) Date: Jul. 25, 2007

(87) PCT Pub. No.: WO2006/079845
PCT Pub. Date: Aug. 3, 2006

(65) Prior Publication Data
US 2008/0304413 A1    Dec. 11, 2008

(30) Foreign Application Priority Data

Jan. 31, 2005 (GB) .................................. 0501945.0
Aug. 19, 2005 (EP) .................................. 05255137

(51) Int. Cl.
*G06F 11/00* (2006.01)
(52) U.S. Cl.
USPC ........... 370/236; 370/232; 370/233; 370/234; 709/223; 709/224
(58) Field of Classification Search
None
See application file for complete search history.

(56) References Cited

U.S. PATENT DOCUMENTS

| | | | |
|---|---|---|---|
| 5,426,640 A * | 6/1995 | Hluchyj et al. | 370/235 |
| 2001/0036154 A1* | 11/2001 | Takagi | 370/229 |
| 2002/0118641 A1* | 8/2002 | Kobayashi | 370/230 |
| 2003/0223361 A1* | 12/2003 | Hussain et al. | 370/230 |
| 2004/0190449 A1 | 9/2004 | Mannal et al. | |
| 2005/0003824 A1* | 1/2005 | Siris | 455/452.1 |
| 2005/0083951 A1* | 4/2005 | Karsten et al. | 370/396 |

FOREIGN PATENT DOCUMENTS

| | | |
|---|---|---|
| WO | 03/049319 | 6/2003 |
| WO | 03/049319 A1 | 6/2003 |
| WO | 2004/049649 A | 6/2004 |
| WO | WO 2004/049649 A1 * | 6/2004 |
| WO | WO2004049649 * | 6/2004 |
| WO | 2005/096566 A1 | 10/2005 |

OTHER PUBLICATIONS

RFC 3168, Ramakrishnan et al., The Addition of Explicit Congestion Notification (ECN) to IP, Sep. 2001, retrieved on Jun. 3, 2010 from http://www.faqs.org/rfcs/rfc3168.html, p. 6.*
International Search Report for PCT/GB2006/000330 mailed Mar. 31, 2006.
Leung et al., "Effect of different marking strategies on explicit congestion notification (ECN) performance," 2001 IEEE International Conference on Communications, vol. 1 of 10, Jun. 11, 2001, pp. 1812-1816, XP010553180.

(Continued)

Primary Examiner — Jason Mattis
Assistant Examiner — James P Duffy
(74) Attorney, Agent, or Firm — Nixon & Vanderhye PC

(57) ABSTRACT

Methods and apparatus for encoding a number of small dynamic values over an n-bit field. Also methods and apparatus allowing for the stateless extraction of separate sequences from repetitions of a single field whereby to communicate more than one signal at once.

31 Claims, 8 Drawing Sheets

General End-to-End Arrangement

OTHER PUBLICATIONS

Pletka et al., "Purple: Predictive active queue management utilizing congestion information," Local Computer Networks, 2003, Oct. 20, 2003, pp. 21-30, XP010665947.
Spring et al., "Robust Explicit Congestion Notification (ECN) Signaling with Nonces," IETF Standard, Jun. 2003, XP015009322.
International Search Report for (parent) PCT/GB2006/000330 dated Mar. 31, 2006.
Extended European Search Report for (priority app) EP 05255137.1, dated Jan. 16, 2006.
Leung I. K. et al., Effect of Different Marking Strategies on Explicit Congestino Notification (ECN) Performance, ICC 2001, 2001 IEEE ICC, Conference Record, Helsinky Finland, IEEE ICC, New York, NY, IEEE, US, vol. 1 of 10, p. 1812-1816, 2001, XP010553180.
Pletka et al., "Purple: Predictive Active Queue Management Utilizing Congestion Information," Local Computer Networks, 2003, Proceedings., 28th Annual IEEE Int'l Conf. on Oct. 20-24, 2003, Piscataway, NJ, USA, IEEE, JP. 21-30, 2003, XP010665947.
Spring et al., "Robust Explicit Congestion Notification (ECN) Signaling with Nonces)," IETF Standard, Internet Engineering Task Force, IETF, RFC3540, CH, 2003, XP015009322.
Ramakrishnan et al., "The Addition of Explicit Congestion Notification (ECN) to IP," IETF Standard, Internet Engineering Taskforce IETF, RFC3168 , p. 3-11, p. 54-58, 2001, XP015008949.
Jain et al., "Congestion Avoidance in Computer Networks With a Connectionless Network Layer," Digital Equipment Corporation technical report DEC-TR-506, 1987.
Savage et al., "TCP Congestion Control with a Misbehaving Receiver,"Universitu of Washing, Seattle, In: Computer Communication Review 29 (5) pp. 71-78, 1999.
Ely et al., "Robust Congestion Signaling," ), Depts. of Computer Science and Engineering, U. of WA, Seattle, U. of CA, San Diego, Proc. IEEE , International Conference on Network Protocols (ICNP'01), 2001.
Braden et al., "Resource ReSerVation Protocol (RSVP)—Version 1 Functional Specification," Internet Engineering Task Force, RFC2205, 1997.
Braden et al., "Integrated Services in the Internet Architecture: an Overview ," Internet Engineering Task Force, RFC1633, 1994.
Nichols et al., "Definition of the Differentiated Services Field (DS Field) in the IPv4 and IPv6 Headers," , Internet Engineering Task Force, RFC2474, 1998.
Blake et al., "An Architecture for Differentiated Services," , Internet Engineering Task Force, RFC2475, 1998.
R.W. Thommes and M.J. Coates, "Deterministic Packet Marking for Time-Varying Congestion Price Estimation," in Proc. IEEE Conference on Computer Communications (Infocomm '04) (Mar. 2004), available from the internet at http://www.tsp.ece.mcgill.ca/Networks/projects/pdf/thommes_INFOCOM04.pdf.

* cited by examiner

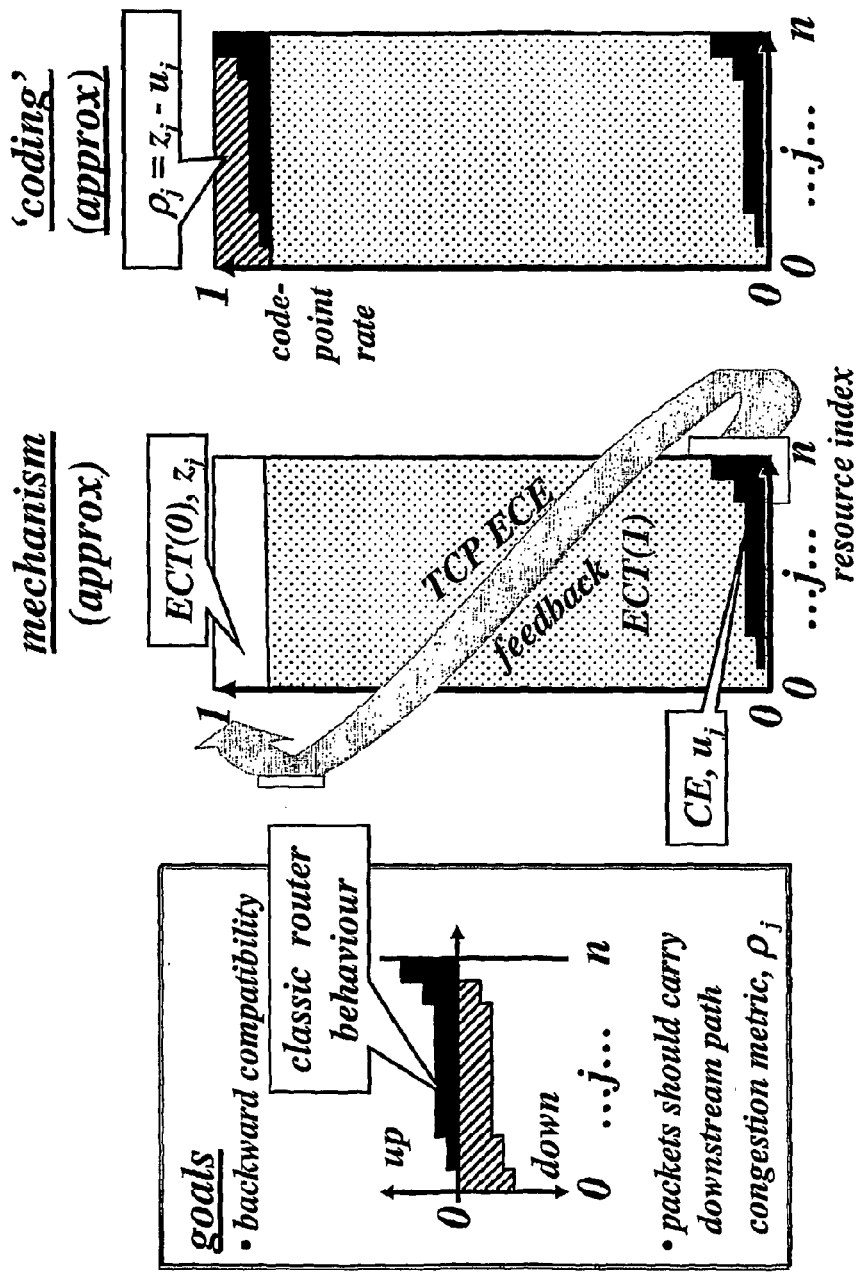
Figure 1 - Diagrammatic Representation of Re-ECN

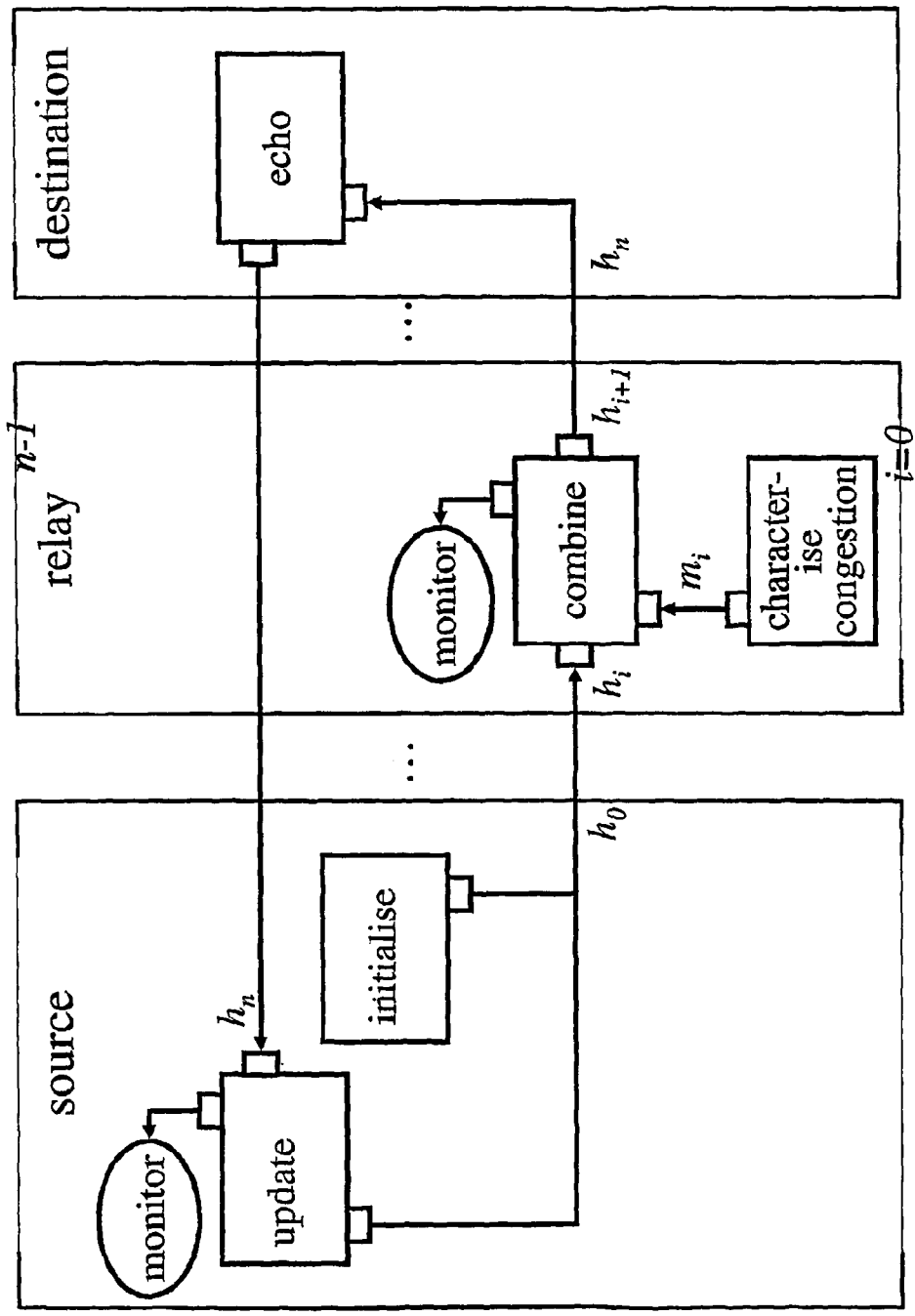
Figure 2 - End-to-End Arrangement

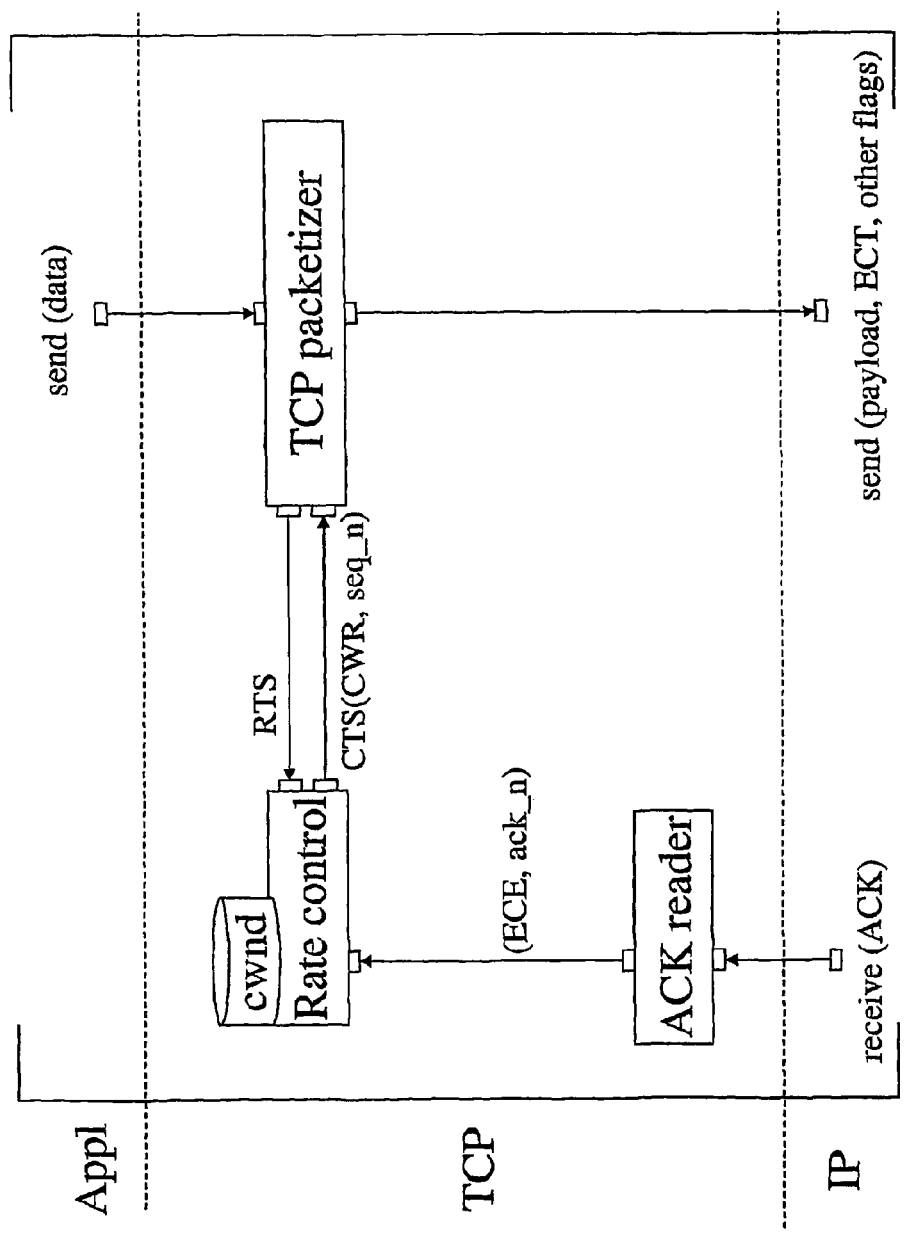
Figure 3 - Simplified Outline of a Standard TCP Socket

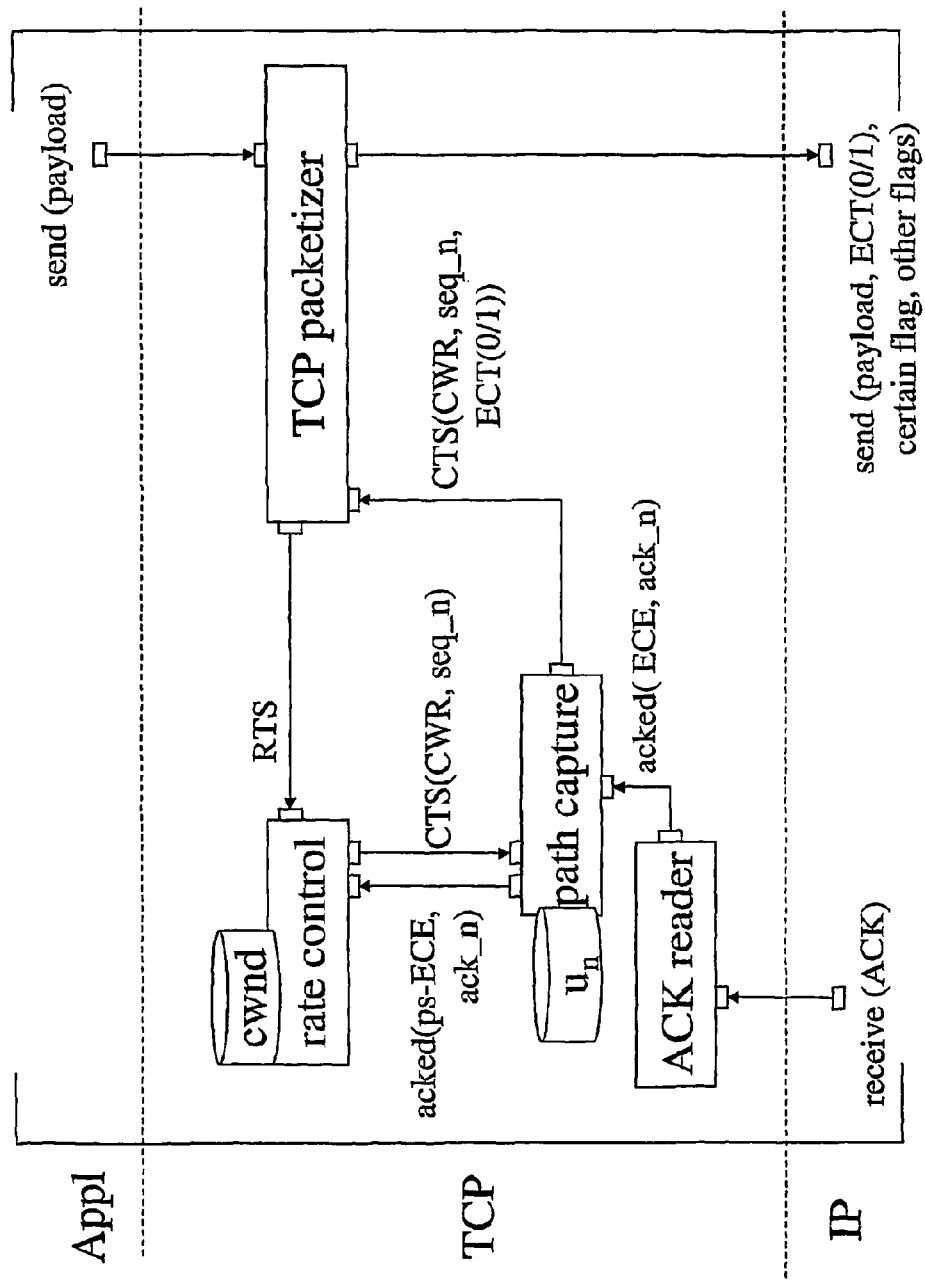
Figure 4 - Simplified Outline of a Re-Feedback TCP Socket

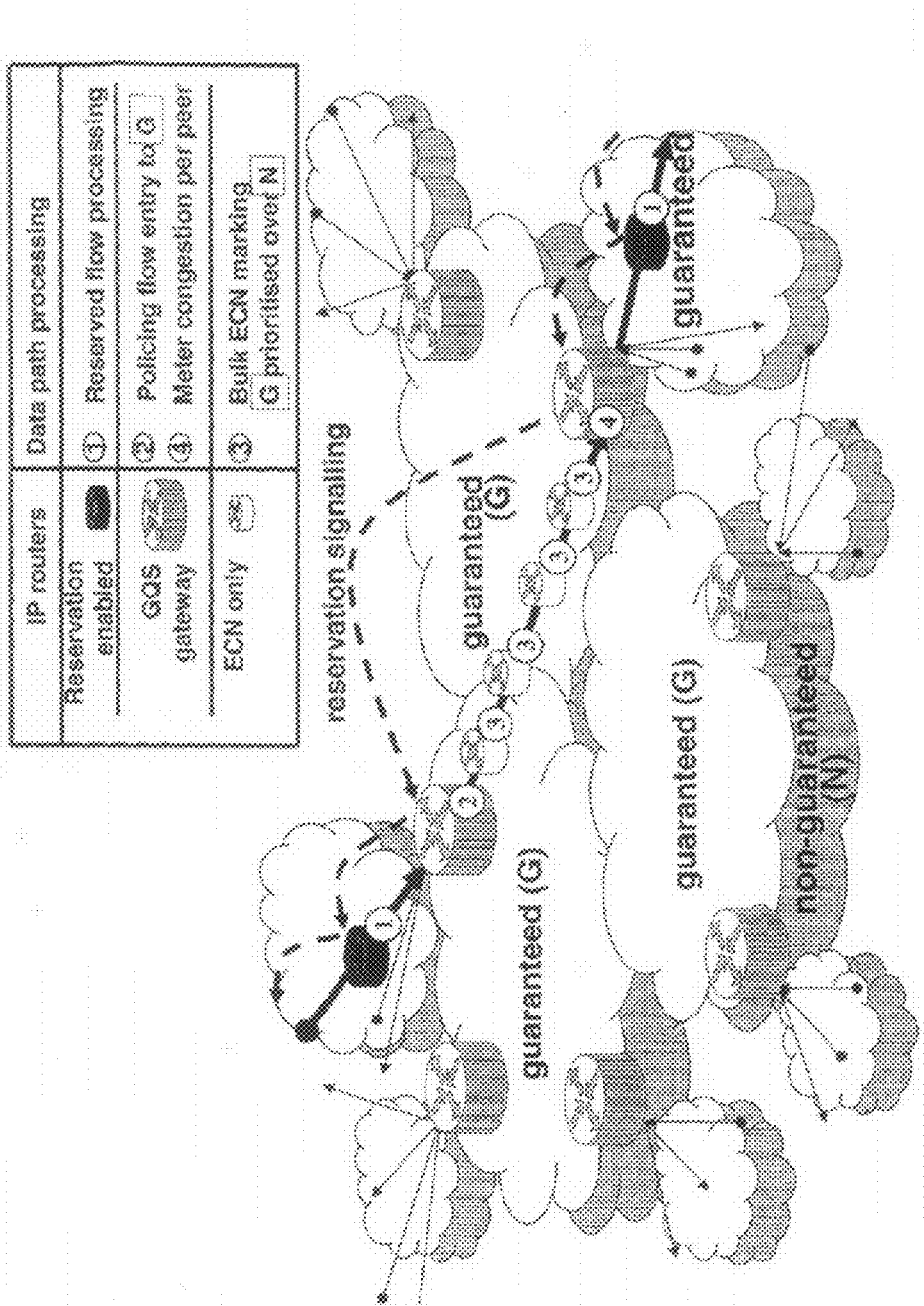
Figure 5 - Arrangement of an Existing Guaranteed QoS Synthesiser (GQS)

| + | 0 - 3 | 4 - 7 | 8 - 15 | 16-18 | 19 - 31 |
|---|---|---|---|---|---|
| 0 | Version | Header Length | Type of Service (now DiffServ and ECN) | Total Length | |
| 32 | Identification | | | Flags | Fragment Offset |
| 64 | Time to Live | | Protocol | Header Checksum | |
| 96 | Source Address | | | | |
| 128 | Destination Address | | | | |
| 160 | Options | | | | |
| 192 | Data | | | | |

Figure 6: Header Format according to IPv4

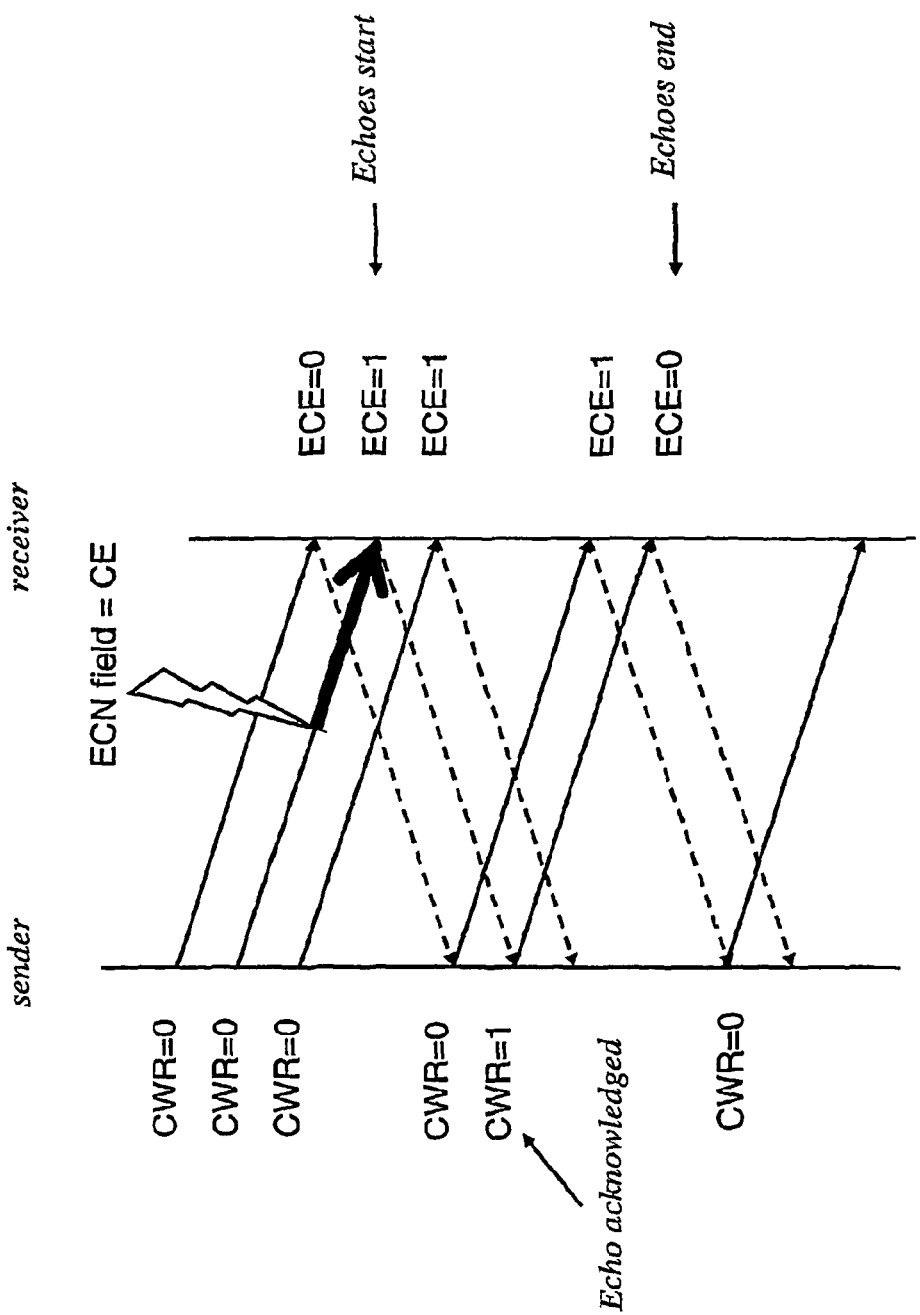
Figure 7 – Standard echo discipline

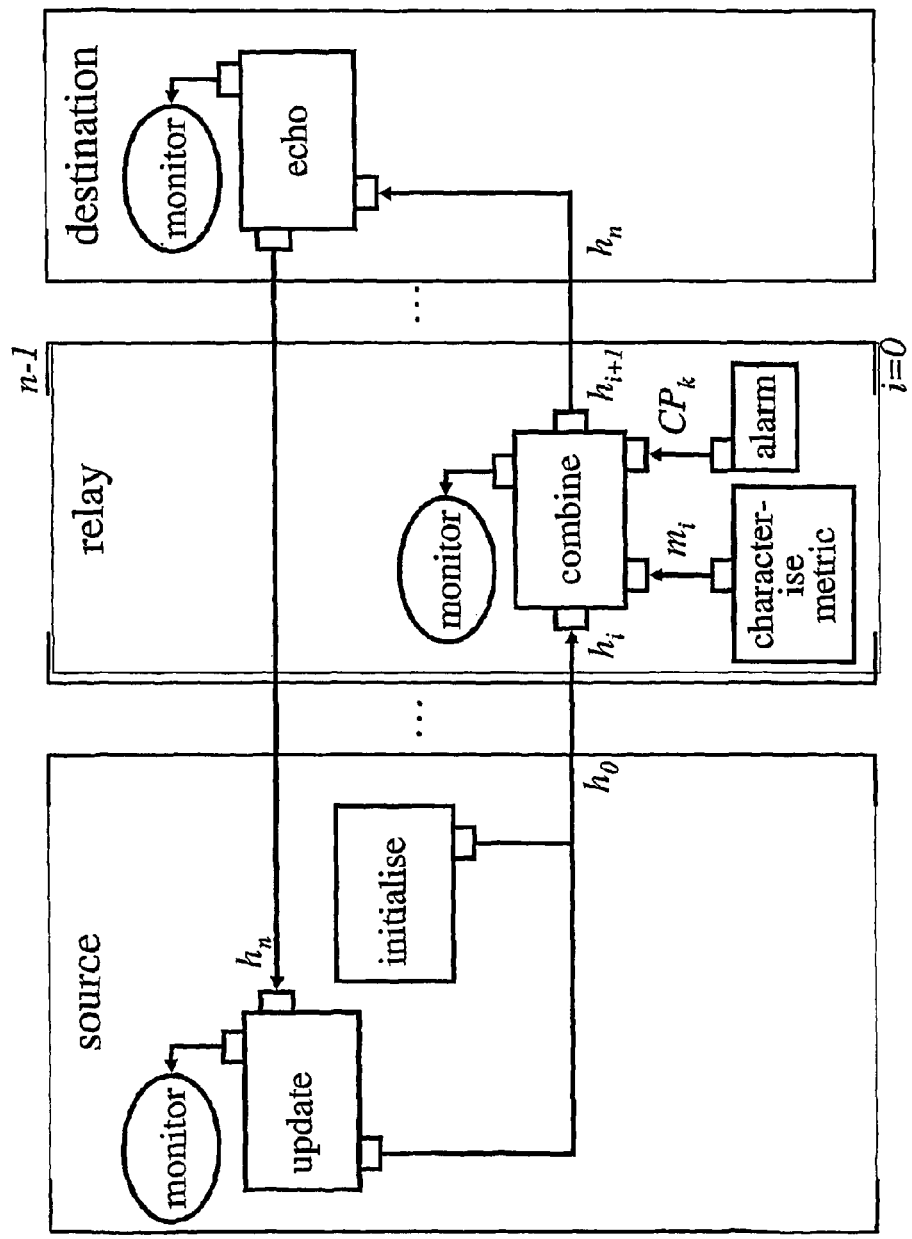
Figure 8 – General End-to-End Arrangement

CONTROL OF DATA IN A NETWORK

This application is the US national phase of international application PCT/GB2006/000330 filed 31 Jan. 2006 which designated the U.S. and claims benefit of GB 0501945.0, dated 31 Jan. 2005, and EP 05255137.1, dated 19 Aug. 2005, the entire content of each of which is hereby incorporated by reference.

BACKGROUND

1. Technical Field

The present invention relates primarily to the control of data in a network.

As will be explained in detail later, preferred embodiments of the invention are concerned with characterising the path traversed by data through a network where each node characterises its local part of the path and then all these local characterisations are accumulated in the data as it passes. For instance the time to live (TTL) field and the explicit congestion notification (ECN) field in the Internet Protocol (IP) header work this way.

2. Related Art

Currently, all known forms of path characterisation initialise the field intended to collect the path characterisation to a set, standardised value. Often, the value accumulated at the destination is fed back to the source. In a co-pending application having publication number WO2005/096566, the subject matter of which is incorporated herein by reference, we described the advantages of ensuring that the initial value of one of these characterisation fields is arranged so that, by the time it has accumulated path information, it tends to arrive at the destination carrying a commonly standardised value. We will refer to the concept set out in this earlier application as "Re-feedback", this term being indicative of the idea of "Receiver-Normalised" feedback (as opposed to "classic" or "traditional" feedback, which in this context may be thought of as "Source-Normalised"). Feedback from the destination to the source may then be used to continuously correct any error in the destination value when future data is sent. A principal advantage is that data effectively carries with it a prediction of its own downstream path for use by in-line equipment along the transmission path.

Although re-feedback brings many advantages, it will be all the more useful if a way can be found to introduce it into current networks by incremental deployment. Specifically, traffic carrying path characterisation should identify itself as based on re-feedback, but it should not be necessary for all relays on a path to be upgraded before re-feedback can be introduced. Then pairs of hosts can arrange traffic between them to carry path characterisation based on re-feedback if they have both been upgraded. But where one or both have not been upgraded, classic feedback can continue to be used.

As will be explained in detail later, preferred embodiments of the invention are concerned with ways to introduce re-feedback of explicit congestion notification into the two bits of the Internet protocol already used for congestion notification without necessarily altering the Internet protocol format and without contravening the current ECN standard (IETF RFC3168)—only altering the semantics of how the fields are understood. For brevity, we will call this concept "re-ECN". Superimposed Coding of Information in Repeated Data Fields Current communications protocols are developed to carry data efficiently over a network according to a given set of requirements. They all use similar structures composed of (some of) the payload data augmented by a protocol header so that the proper service can be provided. Given the global scope of today's communications, standard bodies define exactly what information is put in the headers. Given that header information increases the communication overhead, header fields are usually constrained by very strict size limits. Also, it is easier to design transmission hardware if fields are of known size in known positions within a packet or frame. Therefore it is desirable to be able to communicate signals (that is numbers that change over time) in protocol fields that are smaller than the accuracy required of the signal.

Further, when a protocol design becomes a standard there is very little flexibility to change the length, the nature, the meaning or the use of the fields that were agreed in the first place. However as more services are proposed, as more threats appear, and for other reasons, there is a need to adjust and change the information carried in packet headers. So the meaning of fields that were designed to be large enough often needs to be overloaded with new meaning(s) without increasing its size.

A known technique is to spread information over repeated occurrences of the same field in a protocol. So that, over time, more bits of accuracy can be communicated than the restricted field size seems to allow.

Naïvely, different parts of the same bit representation of a number can be communicated in different packets. But for the reader to interpret the meaning, it must share some context ("state") with the writer. For instance, imagine communicating a 16-bit number in an 8-bit field. We might use the convention that the meaning of the field depends on whether another associated sequence number is odd or even (odd meaning lower significant bits, even meaning higher). Then the reader could put together the pairs of fields with sequence numbers 1,2; 3,4; . . . 19,20 to get the full field.

However, this naïve approach is not useful where the protocol is intended to communicate moving values and be stateless. For instance, unlike IP hosts, IP routers are designed on the principle that state is never created to remember any values in a packet from one packet to the next (routers may create their own aggregate state variables with values derived from all packets, e.g. a counter for accounting). So, even if a router were merely trying to find the moving average value of a field across many packets (for whatever reason), averaging all the odds and averaging all the evens separately wouldn't work.

For example, in a similar vein to the above naïve scenario, imagine finding the moving average over a moving window of values out of the sequence {2.1, 1.8, 2.1, 1.7} by averaging {2, 1, 2, 1} and {0.1, 0.8, 0.1, 0.7} separately. Even if these packets identify themselves as odd or even, they also need to be averaged in order. Imagine the first two values of the higher order sequence arrive out of order. The result would be the average of the sequence {2.8, 2.1, 1.1, 1.7}. This is fine if all the numbers are averaged, but not if the average is moving. For instance the average of the last three numbers is different in the two cases. This naïve approach leads to a systematic bias of error when the signal transitions between one high order number and the next.

In 1987, to address the need for stateless coding of a moving number across repeated instances of a protocol field, DEC developed the approach [Jain87] where the number is repeatedly rounded up or down, with the proportion of roundings down against up continuously increasing the accuracy, but also moving as the number to be communicated moves. So for instance 0.4 could be represented by the sequence of single bits {1,0,1,0,1} or {1,0,1,0,1,1,0,1,0,1, . . . }. Then, if the number changed to 0.2, the sequence would reflect the change: {1,0,1,0,1,1,0,1,0,1, . . . 1,1,0,1,1,}. Although there are random fluctuations in accuracy, there is no systematic bias of error up or down with this technique. Unlike the naïve approach, no packet carries information that is meaningless unless combined with information from another packet to reconstruct the meaning.

As will be explained in detail later, preferred embodiments of the present invention build on this tradition.

Another prior mechanism of relevance is the PURPLE mechanism proposed by Mannal et al [Mannal2003] to which US patent application US 2004/190449 relates, which monitors the occurrence rate of the CWR flag in TCP headers to estimate the end-to-end congestion level a round-trip earlier. With the standard ECN specifications, for each congestion mark (CE, indicating "Congestion Experienced", in the IP header), echoes are sent in all acknowledgments (ECE, the "ECN-Echo" flag, in the TCP header) until the destination receives confirmation that the source has acted upon the congestion signal (CWR, the "Congestion Window Reduced" flag, in the TCP header). This means that CWR flags are going to travel across every node on the path, at the same rate as CE marks reach the destination, with a delay of one round-trip. Mannal et al further suggests to keep in memory the rate of CE marks arriving at any given node for a round-trip. From the end-to-end congestion signal the node receives a round-trip later, the node can extract the downstream congestion level on the path a round-trip earlier. Mannal et al proposes using the value, in combination with the current upstream congestion signal, to control the convergence of the adaptive queue management mechanism on the congested router.

This approach gives very accurate information in the case of a non-encrypted TCP flows. However, the necessary information may not be available in other common cases, such as, for example:
  if IPSec is used, the TCP header is encrypted, and it becomes impossible to monitor the occurrence rate of CWR flags;
  if IPSec is not used but the transport protocol is UDP (as would be the case for RTP streaming traffic), CWR flags cannot be monitored either.

International application WO2004/049649 (King's College London) relates to differentiated marking on routers. It refers to the respective treatment of two groups of packets, referred to as a "first proportion" and a "second proportion". Packets that have spent less time on the network are regarded as being in the first group, and are more likely to be marked than packets that have spent more time on the network, which are regarded as being in the second group. The respective treatments of individual packets deemed to be in the first and second groups thus depend on how long the packets have spent on the network.

REFERENCES

[Jain87] R. Jain, K. Ramakrishnan & D. Chiu, "Congestion Avoidance in Computer Networks With a Connectionless Network Layer", Digital Equipment Corporation technical report DEC-TR-506 (1987).

[Mannal2003] Soenke Mannal, Roman Pletka & Marcel Waldvogel—"PURPLE: Predictive Active Queue Management Utilizing Congestion Information", Proceedings of the 28th Annual IEEE Conference on Local Computer Networks (LCN), Bonn, October 2003.

Other Prior Approaches to Related Problems

Usual solutions to address new protocol requirements that need the addition of new information to protocol header fields or the modification of their nature are either to develop a new protocol, or to use a header with variable length. Both approaches have been used for instance with the development of IP where the address field as been increased from 32 bits to 128 bits between versions 4 and 6. At the same time, any number of optional fields can be added to the header in order to insert further information for processing the traffic.

A prior mechanism of relevance to a related problem is the ECN nonce [Savage99,Ely01], which concerns the ECN field in IP. It will be noted later that specific preferred embodiments of the present invention also concern this field. Also, the motivation behind the two approaches can be thought of as similar in some regards: to prevent cheating during communication of the ECN field. With congestion signalling, it is highly preferable to ensure that a congestion signal cannot be hidden by an end-point that wishes to send or receive data at a higher rate than would be allowed during congestion. The ECN nonce only allows a data source to detect if a receiver is cheating, whereas the wider incentive framework built around the "re-feedback" concept makes it possible to ensure that none of the source, receiver or various networks on the path can, or have any incentive to, cheat against each other. As will become clear later, ensuring that re-feedback is deployable would solve a broader set of cheating problems than can be solved using the ECN nonce. The ECN nonce mechanism has been published by the IETF as an informational RFC [RFC3540], but is not currently on the standards track.

Internet Protocol Headers

Referring briefly to FIG. 6, headers associated with datagrams according to the current version of the Internet Protocol, IPv4, comprise a first 4-bit field indicating this version. The second field is a 4-bit "Internet Header Length" (IHL) field indicating the number of 32-bit words in the IPv4 header. The following 8 bits have been allocated to a "Differentiated Services" field containing the 6 bit Differentiated Services Code Point (DSCP) and the 2 bit "ECN" (Explicit Congestion Notification) field, which is at bits 14 and 15. The DSCP allows it to be specified how the datagram should be handled as it makes its way through the network (i.e. low delay, high priority etc.). The ECN field is set probabilistically at a congested resource so that, over a series of packets, the destination can infer the level of congestion of the path traversed. The next 16-bit IPv4 field defines the entire datagram size, including header and data, in 8-bit bytes. The minimum-length datagram is 20 bytes and the maximum is 65535.

The next field is a 16-bit "Identification" field. This field has primarily been used for unique identification of fragments of an original IP datagram. It has been suggested that this field could be used for other purposes, such as for adding packet-tracing information to datagrams. A 3-bit "Flags" field follows which is used to control or identify fragments. This is followed by a 13-bit "Fragment Offset Field" which allows a receiver to determine the position of a particular fragment in the original IP datagram.

The next field is an 8-bit "Time-To-Live" (TTL) field, which aims to prevent datagrams from persisting (e.g. going around in loops) within a network. Historically the TTL field limited a datagram's lifetime in seconds, but it has come to be a "hop count" field, with some attempt to maintain the original meaning by hops across large distances making themselves appear as multiple hops. The value may initially set at 255. Each packet switch (or router) that the datagram crosses decrements the TTL field by one (or maybe more at interfaces to long distance links). If the TTL field hits zero before reaching its intended destination, the packet is no longer forwarded by a packet switch and is thus discarded.

An 8-bit Protocol field follows. This field defines the next protocol used in the data portion of the IP datagram. The Internet Assigned Numbers Authority maintains a list of Protocol numbers. Common protocols include ICMP, TCP and UDP.

The following field in an IPv4 datagram header is a 16-bit "Checksum" field. Some values in an IPv4 datagram header may change at each packet switch hop, so the checksum may need to be adjusted on its way through a network. The checksum is followed by 32-bit "Source Address" and a 32-bit "Destination Address" fields respectively.

Additional header fields (called "Options") may follow the destination address field, but these are not often used.

The ECN Field

The concept of the ECN field in IP can be traced back to the "DECbit" scheme mentioned above, having also appeared in ATM and Frame Relay. In IP, ECN consists of two bits at the end of the 8-bit Differentiated services field, leading to four possible code-points, which are standardised in RFC3168 [RFC3168]. These are shown with reference to accompanying Table 1 below.

ECN Code-Points

TABLE 1

| Code-point | Meaning | Designation |
| --- | --- | --- |
| 00 | Not ECN-capable transport | Not-ECT |
| 01 | ECN-capable transport | ECT(1) |
| 10 | ECN-capable transport | ECT(0) |
| 11 | Congestion experienced | CE |

The first three code-points are intended to be set by the sender at the start of transmission of a packet, while the last (CE) is reserved for relays to set to indicate that the packet has experienced congestion. If a source pre-dates the ECN standard, it will send a clear ECN field (not-ECT) which has always been the default. If it does understand ECN, but after negotiation at the start of a connection it determines that the other end-point doesn't, it also leaves the ECN field clear (not-ECT). If a not-ECT packet arrives at an IP relay during congestion, it is probabilistically dropped. If an ECT packet arrives at a congested relay the CE field is probabilistically set. This behaviour allows for incremental deployment of ECN, falling back to the earlier behaviour of dropping packets during congestion if either end-point has not been upgraded to understand ECN.

The proportion of packets that have the CE field set represents the level of congestion drawn from the range [0,1]. Thus, the CE field is used to communicate a signal (the time-varying congestion level) from relay to receiver. If there is more than one congested relay on any transmission path, their signals are combined to give the aggregate congestion on the path. For instance, if a packet flow passes through one relay marking 5% of packets with CE and another marking 10%, by combinatorial probability, the receiver will see 100%−(100%−5%)(100%−10%)=14.5% CE marking over a sequence of packets. This form of combination is deliberate, as a congestion signal represents the probability of capacity exhaustion, so multiple congestion signals should be combined as multiple probabilities would be combined. In practice, Internet paths operate at congestion levels under 1-2% most of the time.

The ECN standard for IP allowed the sender to set either of two equivalent values to indicate ECN capability: ECT(0) or ECT(1). Although the ECN nonce was not standardised into ECN, this choice was deliberately provided in the standard to allow sources to use the ECN nonce if they chose to. But other uses of the two ECT code-points were also envisaged as possible, such as one for multicast (embodiments of our invention make use of the flexibility offered by this choice of ECT values). The nonce works as follows.

The sender sends out each packet with either ECT(0) or ECT(1) in pseudo-random unbiased binary sequence. From the start of the connection the sender maintains the sum of this sequence, treating the two ECT values respectively as binary 0 & 1. In fact, the scheme only needs the sender to maintain the least significant bit of the sum. Thus, if each new binary ECT value sent is X, the sum S can be maintained with a logical exclusive OR function:

$$S \leftarrow S \oplus X.$$

The receiver should also maintain this sum.

The receiver must feedback whether or not each received packet was marked CE (actually the standard allows feedback for multiple packets at once, but that complexity is not important here). The ECN standard [RFC3168] introduced a binary field (echo congestion experienced or ECE) in the TCP header for this purpose. The ECN nonce scheme [RFC3540] introduces another binary flag in the TCP header (the nonce sum or NS) for the receiver to also feedback its newly calculated version of nonce sum. As long as no packets are marked with CE, the sender and receiver will both be able to maintain the same nonce sum for a sequence of packets without gaps. Since TCP ensures all dropped packets are re-transmitted, a whole flow will proceed without gaps as retransmissions repair any gaps in the sequence.

Whenever a relay marks a packet with CE due to congestion, the receiver cannot guess whether the sender originally sent it with ECT(0) or ECT(1). If an honest receiver receives a packet marked CE, it will send ECE feedback and both the sender and receiver will re-start (zero) their nonce sum for the next packet. If a malicious receiver tries to deny the existence of congestion by not echoing ECE in response to a CE mark, it must also feed back an updated nonce sum. But, because it doesn't know whether the sender used ECT(0) or ECT(1) to update the sender's version of the nonce sum, the receiver only has a 50% chance of getting the nonce sum right. The more congestion feedback the receiver tries to suppress, half the time it will get the nonce sum wrong. As soon as the sender detects an incorrect nonce sum, it can fall back to not using ECN by setting not-ECT in future packets, or some other sanction, perhaps even refusing to send further data.

It can be seen that the ECN nonce allows the sender to detect a misbehaving receiver. But that is only useful if the sender is both willing to comply with voluntary congestion control itself, and is willing to apply sanctions to receivers that don't comply. The ECN nonce was seen as useful in the environment of the late 1990s where most data was sent by large corporate sites, either Web servers or content streaming sites. It was hoped that such sites might wish to maintain a reputation for policing the Internet's congestion control norms. With some 80% of traffic currently peer-to-peer, this already rather optimistic assumption is no longer tenable. The present invention allows re-feedback to be deployable, so that networks can police congestion norms for themselves.

REFERENCES

[Savage99] Stefan Savage, Neal Cardwell, David Wetherall and Tom Anderson, "TCP Congestion Control with a Misbehaving Receiver," In: Computer Communication Review 29 (5) pp. 71-78 (October, 1999).

[RFC3168] K. K. Ramakrishnan, Sally Floyd and David Black, "The Addition of Explicit Congestion Notification (ECN) to IP," Internet Engineering Task Force Request for comments RFC3168, URL: http://www.ietf.org/rfc/rfc3168.txt (September, 2001)

[Ely01] David Ely, Neil Spring, David Wetherall, Stefan Savage and Tom Anderson, "Robust Congestion Signaling" In: Proc. IEEE International Conference on Network Protocols (ICNP'01) (November, 2001).

[RFC3540] Neil Spring, David Wetherall and David Ely, "Robust Explicit Congestion Notification (ECN) Signaling with Nonces" Internet Engineering Task Force Request for comments RFC3540, URL: http://www.ietf.org/rfcs/rfc3540.txt (June, 2003) (Status: informational)

BRIEF SUMMARY

According to the present exemplary embodiment, there is provided a method of encoding information using a plurality of messages traversing a plurality of nodes in a network, said messages each having a header associated therewith comprising one or more fields, at least a selected portion of each header providing at least three codepoints; said method comprising assigning a codepoint from a first set of codepoints of the selected portion in headers associated with a first proportion of messages, and assigning a codepoint from a second set of codepoints of the selected portion in headers associated with a second proportion of messages, characterised in that
    said first proportion is determined in dependence on a first network characteristic;
    said second proportion is determined in dependence on a second network characteristic; and
    at least one of said first and second network characteristics is variable independently of the other of said network characteristics.

Preferred embodiments of the present invention relate to methods of encoding a number of small dynamic values over an n-bit field.

Preferred embodiments of the present invention allow for the stateless extraction of separate sequences from repetitions of a single field, whereby to communicate more than one signal at once, and for the superposition of the results of each by various arithmetic combinations to communicate further information. In order to illustrate this, we will consider a progression of increasingly advantageous solutions as to how the above may be achieved, after which a scheme according to a preferred embodiment of the invention will be described in detail. For convenience, we will refer to this scheme as "re-ECN".

Where methods according to the invention are implemented in relation to the current IP, it will be understood, that the "messages" will in general be IP packets. This will generally be the case in relation to the preferred "re-ECN" embodiments since ECN currently exists only for IP, but it will be understood that the messages will not necessarily be packets in relation to all networks, for example in the future.

It will be understood that according to a currently preferred embodiment, the field is an existing 2-bit binary field (the ECN field), which thus allows four codepoints, but that other embodiments of the invention may be applicable where the field has a different number of bits, provided that the field has at least three codepoints. It is thus foreseeable that the field is a 1-bit ternary field. Where the field provides several more than three codepoints (for example, a 3-bit binary field, providing 8 codepoints), two or more codepoints may be regarded or treated as equivalent for the purposes of the invention, in which case they may be thought of as a "set of codepoints". Such embodiments may be thought of as "less efficient" in relation to their use of the available codepoints, but it will be noted that they may provide some alternative or additional advantages.

It will also be understood that according to another currently preferred embodiment, the selected portion of the header need not be a portion corresponding strictly to one named "field" in the header, but may comprise a contiguous subset of bits selected from the header associated with each message. Further embodiments may even use a subset of non-contiguous bits. Another currently preferred embodiment uses the two bits of the existing ECN field combined with "bit 48" in the current IP header, the three bits thus providing a total of eight possible codepoints. As will be explained in more, detail later, while this alternative uses up an extra bit in the IP header, it has the advantage of allowing the processing at the source and at the network nodes to be simplified Referring back to the PURPLE mechanism proposed by Mannal et al [Mannal2003] and the corresponding US patent application, it will be noted that embodiments of the present invention differ from prior art such as these in particular due to the fact that action need only be taken in respect of one type of header (accessible in one layer, such as the IP or Network layer) in order to encode information relating to the two different characteristics, as opposed to action being taken in respect of two different types of headers (the IP header and the TCP header) accessible only via two different layers (the Network layer and the Transport layer) as is the case in the Mannal approach. By virtue of this, embodiments of the present invention avoid the shortcomings of the Mannal approach, and can thus support both the use of other transport protocols as well as the use of IPSec, for example.

A Progression of Possible Solutions

The benefits of "re-feedback" derive from the congestion signal in a packet representing predicted downstream congestion. With reference to the concept of re-feedback, the possible solutions below may be thought of as mechanisms aiming to implement the requirement of re-feedback.

Possible Solution #1

If recent feedback of a stream of acknowledgements from the receiver showed 3% congestion on the path, a naïve approach would be for the sender to set the congestion experienced code-point (CE) in 2% of packets, and for a 2% congested relay to remove CE from 2% of packets. But this would in general prove impractical. Whenever the relay wished to signal the number 2%, it would have to wait while some 50 or so unmarked packets passed before a CE marked packet arrived to be cleared.

Possible Solution #2

A better alternative would be for the sender to alternate ECT(0) and CE, but send about 2% less CE than 50%, replacing them with ECT(0). In other words, marking ~48% CE and ~52% ECT(0). Then the relay would only have to wait on average about one packet before finding an ECT(0) packet it could mark with CE.

At this point we will introduce some notation. We represent the rate of CE at node j on a path by $u_j$. And along a path, the sender has index j=0 and the receiver j=n, with the relays in between being indexed $\{1, 2, \ldots j, \ldots n-1\}$. Further, the downstream path congestion level at any node j in the network is represented by $\rho_j$, so $\rho_0$ will represent whole path congestion, which we will sometimes abbreviate to simply $\rho$.

So, for this solution, the downstream path congestion from node j will be $$\rho_j \approx 50\% - u_j.$$

If the source stores the rate $u_0$ at which it sends CE, it can derive the path congestion rate by subtracting the rate $u_n$ fed back by the receiver. But this solution cannot be incrementally deployed, because currently routers mark CE without regard to whether it is already set (giving the desired combinatorial probability mentioned already). So they would all have to be upgraded at once.

Possible Solution #3

So a yet better third alternative would be for the source to still alternate CE and ECT(0) but send about half of 2% less CE than 50% (still continuing our scenario where recent path congestion ρ is 2%). In other words, marking ~49% with CE and ~51% ECT(0). Then given routers mark CE without regard to whether it is already marked, about half of 2% of ECT(0) packets would gain a CE mark, raising the proportion of CE from 49% to 50%. In general, if recent path congestion were $\rho_0$, and the standardised, constant target rate of marking is $u_z$=50%, then the source should mark CE at rate $u_0$ where $$1 - (1 - u_0)(1 - \rho_0) = u_z$$
$$\Rightarrow u_0 = 1 - (1 - u_z)/(1 - \rho_0)$$
e.g. for $\rho = 2\% = 0.48979$
$$\approx 49\%$$

If the rate of CE marking at any node j in the network is $u_j$, then downstream congestion $\rho_j$ from that node can be predicted by the rate $$\rho_j = 1 - (1 - u_z)/(1 - u_j)$$

However, this scheme halves the responsiveness of ECN (about half the marks are applied to packets that have already been marked), which is undesirable given a binary scheme like ECN is already slow to communicate low levels of congestion (giving insufficient notice before low levels become high levels). Also all the above schemes require the sender to initiate some packets with CE, which is not permitted by the current ECN standard, complicating backward compatibility.

Solution According to a Preferred Embodiment: "Re-ECN"

With an aim of solving some or all of the above problems, we propose a new use of the ECT code-points of ECN to implement re-feedback, called re-ECN. As always, not-ECT packets should be dropped rather than marked. But, for all other packets, we define what is effectively a virtual header field h. We define the value of $h_j$ at any node j on the path as the difference between the rate $u_j$ of CE code-points and the rate $z_j$ of ECT(0) code-points traversing that node, that is:

$$h_j = u_j - z_j. \tag{1}$$

In accordance with the re-feedback arrangement, once the sender receives feedback that characterises path congestion, it arranges the starting value $h_0$ of this virtual header so that the virtual header will reach a common datum $h_z$ at the destination. Typically it does this by assuming path congestion remains unchanged since the latest feedback. For re-ECN we recommend the industry should standardise $$h_z = 0.$$

In order to comply with the current ECN standard, we don't want the sender to initialise any packets with CE. So $u_0$=0. Then, in order to zero the virtual header at the destination, the sender should set ECT(0) on the proportion of packets $$u_n \leq 1/2: \quad z_0 = u_n/(1 - u_n) \tag{2}$$
$$u_n > 1/2: \quad = 1,$$

which it can derive from continuous feedback of $u_n$, already provided by TCP. It will be shown why this equation is so later.

Further, we show that the virtual header $h_j$ in packets arriving at any node j on the path is sufficient for the node to derive a prediction of downstream path congestion $$\rho_j = 1 - 1/(1 - h_j) \tag{3}$$

If path congestion is low, $h_j \ll 1$, it will be shown later that this formula approximates to $$\rho_j \approx -h_j \tag{3a}$$
$$\approx z_j - u_j.$$

In other words, for low levels of path congestion, a node can approximate downstream congestion as the simple value of the virtual header—the difference between the rates of ECT(0) and CE code-points, thus avoiding a division operation per packet which would otherwise use more processor cycles than is desirable in the data path. This approximation causes a relay to underestimate downstream congestion. So a policer using this approximation will be slightly permissive, which will usually be preferable. If accuracy is important, of course, the approximation need not be used.

In fact, if path congestion is low, the formula the sender uses to determine how much ECT(0) to set also has a simple approximation $$z_0 = u_n/(1 - u_n) \tag{2a}$$
$$\approx u_n.$$

In other words, the source should set the same proportion of ECT(1) as the proportion of acknowledgements that echo congestion experienced (ECE). Otherwise it should set ECT (0). Again, it should never set CE, which complies with the current ECN standard.

However, it is possible to implement the exact function with no operation more complicated than a multiplication (and even only a register shift if the exponentially weighted moving average (EWMA) weight is a multiple of two).

Referring to FIG. 1, the horizontal axes of the plots represent nodes indexed {0, . . . j, . . . n} on a path through an inter-network. The vertical axes represent the rate at which the different ECN code-points occur as a stream of packets traverses an example path. Of course, the rates would continuously change, but the figure shows the average rate at one instant, as if congestion were stationary. Each plot is cumulative upon the one below, so that the total always sums to 1. The black shaded area represents congestion experienced (CE) markings accumulating across the path, due to congestion at ECN routers—unchanged from current behaviour. In the middle figure, the resulting rate of CE is shown fed back to the source, which sends approximately the same proportion of ECT(0).

The right hand figure shows how downstream path congestion can be decoded from the signal streams. At any node j on the path, if the rate of occurrence of CE, $u_j$ (black) is subtracted from the rate of ECT(0), $z_j$ (white in the middle figure), downstream path congestion is revealed (striped). As those in the art will appreciate, each node herein discussed as being involved in performing ECN processing will include at least one programmed processor respectively configured to perform herein described processes assigned to that node.

The embodiment described above uses the ECT(0) codepoint to signal the end-to-end congestion level on the path of the flow, in order to minimise the number of bits used in the IP header. If that requirement is not prevalent, a simple alternative with a similar effect is to use a bit outside of the ECN codepoint to carry the end-to-end congestion signal, for instance bit 48. This alternative uses up more bits in the IP header but has the advantage of simplifying processing at the source and at the network nodes: as bit 48 is not re-marked when "Congestion Experienced" is set on the ECN codepoint, there is no need for adjustment of the ECE signal received from the destination.

Specific Re-ECN Embodiment

The concept of re-feedback—where feedback in networks is aligned with its reference datum at the receiver rather than the sender—is not thought to have been disclosed prior to our co-pending application discussed earlier. Therefore, a protocol mechanism such as re-ECN capable of implement re-feedback without contravening existing protocol standards is likely to be unique in its own right. As set out below, however, the scope of the present invention is not limited to such preferred embodiments.

Generalisation of Re-ECN

Referring again to the ECN nonce, the ECN nonce is used by the sender to compare a signal it injects into the packet stream with that the receiver feeds back. The ECN nonce is not used to communicate any signal from one party to another. Preferred embodiments of the invention use the "Re-ECN" concept to communicate a signal (representing the path congestion) from a path of network nodes to both the source and to the other network nodes, particularly those upstream.

On the one hand, the ECN nonce codes the sum of the occurrences of one ECT code-point starting from the most recent congestion event and finishing at the current packet. On the other hand, re-ECN codes two signals using the rate of occurrence of two code-points. Re-ECN then combines the two signals by subtraction.

Although the ECN nonce uses two code-points, during a stretch between congestion events one is always constrained to be the complement of the other. The other ECN code-points are used independently for different purposes. So the ECN nonce can only code one signal. Because re-ECN uses three code-points at once, two independent signals can be created, with only the third constrained to be the complement of the sum of the other two. This differentiates re-ECN by creating more than one independent signal. Then the coding scheme can use an arithmetic relation between the two signals—impossible with only one signal.

It is possible that other coding schemes use the rate of occurrence of a code-point (although we cannot find any in the literature except the ECN nonce). But it is believed that none use the rates of more than one code-point, let alone a relation between these rates.

In fact, by coding two independent signals, preferred embodiments of the invention using re-ECN may be capable of simultaneously signalling three potentially useful metrics to any node j on the path, using just 1.5 bits (i.e. three out of the four options available from two bits):

$u_j$, congestion upstream of $j$ $-h_j/(1-h_j) \approx -h_j$, congestion downstream of $j$ $z_j/(1-h_j) \approx z_j$, whole path congestion both upstream and downstream of $j$ As already explained, re-feedback may be used to provide upstream inline equipment with frequent, truthful information predicting the downstream path of each packet carrying the information. This allows networks to police whether sources are responding correctly to the changing characteristics of their path, in particular to congestion variation.

Advantages of re-ECN include the fact that it allows re-feedback to be implemented, which itself allows for an improvement over the prior art in relation to policing congestion response. In this regard, preferred embodiments of the invention using re-ECN may be used to improve on the ECN nonce. Re-ECN enables the network to police the sender even if it is collaborating with the receiver. The ECN nonce only enables the sender to police the receiver and doesn't enable the network to police anything.

Preferred embodiments of the invention using re-ECN re-use existing protocol fields by superimposing different information into the same field, thereby making the limited information space more useful.

In addition, preferred embodiments of the invention using re-ECN may enable one or more of the following three features, deliberately designed to ease incremental deployment:

Relays Unchanged:

A relay marks packets during congestion no differently for re-ECN than ECN. If this were not the case, the end-points would need to be assured either that all relays were using re-ECN or that they all were not. Otherwise, the only alternative would be to provide a congestion field for each style of signalling, and somehow combine them at the destination. Thus, end-points can incrementally deploy re-ECN and whenever a re-ECN sender finds it is communicating with a re-ECN receiver, they can use re-ECN without regard to whether the relays on the path have been upgraded, as no upgrade is necessary.

Legacy Flows Appear as High Congestion:

It might seem the choice is arbitrary between which of ECT(0) & ECT(1) to use for the downstream path metric. But we choose ECT(0) deliberately. A particular goal of specific embodiments is for a network to be able to use re-ECN to police traffic from a mixture of non-ECN-capable, classic-ECN-capable and re-ECN-capable hosts. Currently, it is not possible for a network to police congestion response at all. Re-ECN gives the network the information to make policing possible. But rather than only policing hosts that have upgraded to re-ECN, we police all flows as if they are using re-ECN. Then we can arrange policing in such a way that legacy flows are increasingly throttled over the months and years, while re-ECN flows are treated very permissively at first, but eventually only behaving re-ECN flows will traverse the policers unscathed.

The ECN standard advises that, if only one ECT code-point is used by the source, it should use ECT(0). If the ECN nonce is used, the proportion of ECT(0) and ECT(1) must be equal. To our knowledge, no other uses of ECT(1) have been proposed, other than for multicast, but that use has not been implemented. Therefore, all sources not using re-ECN should send no less ECT(0) than ECT(1):

For non-re-ECN $z_0 \geq \frac{1}{2}$.
For re-ECN, if $z_0 \geq \frac{1}{2}$; Eqn (2) $\Rightarrow u_n \geq \frac{1}{3}$
Such high levels of congestion are unusual, so usually, if $u_n < \frac{1}{3}$
for re-ECN $z_0 < \frac{1}{2}$ In other words, for any specific path with $\rho < \frac{1}{3}$, if a source must choose between using re-ECN or not, $z_0$ (and hence $z_j$ at any point downstream) will be higher if it doesn't use re-ECN than if it does. Therefore, given $u_j$ is the same whether or not re-ECN is used, re-ECN's definition of downstream congestion $z_j - u_j$ in Eqn (1) will be higher if re-ECN is not used.

The wider incentive framework around re-feedback causes a graceful degradation in throughput the more that downstream congestion is overstated. But understatement causes a sharp fall in throughput. So we deliberately chose ECT(0) for the path metric to ensure sources not using re-ECN will appear to overstate downstream congestion—when we treat them as if they are using re-ECN.

So, if a policer throttles any source by assuming it is using re-ECN to declare downstream path congestion (even if it isn't), sources not using re-ECN will be disadvantaged but not catastrophically. Therefore, re-ECN policers can be initially deployed at the ingress to the Internet so that they are very permissive to re-ECN flows but slightly strict against classic ECN flows. Over the months and years, policer policies can be tightened up so that stragglers who have not upgraded to re-ECN suffer progressively more throttling.

Whenever path congestion peaks above ⅓, classic ECN sources using the nonce will be understating downstream congestion and therefore in danger of suffering the much less graceful sanction of a dropper. However, dropping traffic that hasn't upgraded when congestion is above ⅓ will be rare, but still frequent enough to give a further incentive to upgrade.

No Additional Delay Signalling Congestion:

Relative to classic ECN, a router signals congestion to the end-points identically, and therefore with no change to the current dynamics. Between CE markings, classic ECN allows either ECT code-point, so we merely constrain the proportions between the two.

BRIEF DESCRIPTION OF THE DRAWINGS

Preferred embodiments of the invention will now be described in more detail with reference to the accompanying figures, in which:

FIG. 1 is a diagrammatic representation of the concept of "re-ECN";

FIG. 2 illustrates an end-to-end arrangement in relation to an implementation according to a first preferred embodiment of the invention, which focuses on congestion notification;

FIG. 3 is a simplified outline of a standard TCP socket;

FIG. 4 is a simplified outline of a re-feedback TCP socket;

FIG. 5 shows an arrangement of an existing guaranteed QoS synthesiser (GQS);

FIG. 6 shows the header format for the current version of the Internet Protocol, IPv4;

FIG. 7 illustrates standard echo discipline; and

FIG. 8 illustrates a more general end-to-end arrangement than that shown in FIG. 2.

DETAILED DESCRIPTION OF EXEMPLARY EMBODIMENTS

Before going on to describe preferred embodiments by virtue of which the present invention may be implemented, there is provided a discussion of the derivations of some of the formulae which will be referred to later. After that, preferred embodiments of the invention will be described with reference to three particular implementation examples.

Derivations of Formulae

The preferred or ideal implementation of re-ECN depends on the formulae used to define the signal rate from the network to the source and from the source to the network. So firstly, we derive the formulae used in the brief description above.

As above, we define the value of $h_j$ at any node j on the path as the difference between the rate $u_j$ of CE code-points and the rate $z_j$ of ECT(0) code-points traversing that node, that is:

$$h_j = u_j - z_j. \tag{1}$$

Our aim is to zero this header at the destination, that is to ensure the rate of ECT(0) at the destination $$\text{Objective: } z_n = u_n.$$

If the sender sets a proportion $z_0$ of packets with ECT(0) in order to reach $z_n$ at the destination, some will be marked by relays on the path, turning them into CE. In order to comply with the current ECN standard, we don't want the sender to initialise any packets with CE. So $u_0 = 0$ and therefore $u_n z_0$ packets will start as ECT(0) but end as CE. So the rate of packets that remain set to ECT(0) at any node j will be $$z_j = (1 - u_j) z_0, \tag{4}$$

or at the destination $$z_n = (1 - u_n) z_0.$$

So, substituting our objective into the above equation, the sender should set ECT(0) on the proportion of packets $$z_0 = z_n / (1 - u_n) \tag{2b}$$
$$= u_n / (1 - u_n),$$

which the sender can derive from continuous feedback of $u_n$, which TCP already provides.

If any node j knew the eventual CE marking rate downstream, $u_n$, it could derive downstream path congestion using the CE marking rate $u_j$ of arriving packets $$\rho_j = 1 - (1 - u_n)/(1 - u_j).$$

This formula is a result of congestion marking being probabilistic. We prove it by taking the marking probability on any node i as $m_i$, then the marking probability after a sequence of j nodes will be $$u_j = 1 - \prod_{i=0,(j-1)} (1 - m_i)$$

-continued $$\Rightarrow \rho_j = 1 - \prod_{i=j,(n-1)} (1 - m_i)$$

$$= 1 - \prod_{i=0,(n-1)} (1 - m_i) / \prod_{i=0,(j-1)} (1 - m_i)$$

$$= 1 - (1 - u_n)/(1 - u_j).$$

Substituting and simplifying, it can be shown that this expression for downstream path congestion can be put in terms only of variables locally known to node j:

From Eqn (2b) $u_n = z_0/(1 + z_0)$    (3)

& from Eqn (4) $z_0 = z_j(1 - u_j)$ $$\Rightarrow \rho_j = 1 - 1/(1 - (u_j - z_j))$$

$$= 1 - 1/(1 - h_j).$$

Approximations

If path congestion is low, Taylor expansion gives downstream congestion from node j $$\rho_j = 1 - 1/(1 - h_j) \quad (3a)$$

$$= 1 - (1 + h_j + h_j^2 + \ldots)$$

$$h_j \ll 1: \approx -h_j$$

Similarly Eqn (2b) becomes $$z_0 = u_n(1 + u_n + u_n^2 + \ldots) \quad (2a)$$

$$u_n \ll 1: \approx u_n.$$

However, this second approximation is unnecessary and causes the sender to understate congestion, so we do not recommend it.

Assuming the wider incentive framework of re-feedback (which is outside the scope of this discussion), as the network may use the precise form to estimate downstream congestion, it will be safer for the source to overstate downstream path congestion using the precise form of Eqn (2b).

Boundary Conditions

Defining u and z as rates of occurrence of the code-points CE and ECT(0) from a 2-bit field constrains their size to the range $$u, z \in [0, 1].$$

And $h = u - z$ $$\Rightarrow h \in [-1, 1].$$

Also $u + z \leq 1$.

From Eqn (2b) $u_n = z_0/(1 + z_0)$ $$\leq 1/2.$$

So the formula for $z_0$, the initial rate of ECT(0), must be stated in parts $$u_n \leq 1/2: \quad z_0 = u_n/(1 - u_n) \quad (2)$$

$$u_n > 1/2: \quad = 1.$$

Under stationary conditions the rate of CE rises from zero up to the rate of ECT(0) as the path is traversed. So u≦z, implying h≦0. But the rate of ECT(0) that a sender sets may sometimes be insufficient to outnumber a transient increase in CE marking before the sender gets the feedback it needs to increase the rate of ECT(0). So h may be drawn from its full range [−1, 1] during these transients. Congestion represents a probability, therefore it should lie in the range [0, 1]. But ρ may lie outside this range because it is merely a prediction of downstream path congestion that is intended to be routinely mis-estimated, with underestimates following overestimates so that a moving average will be useful. However, ρ is non-linear with prediction errors, whereas h is linear. Therefore averaging should not be applied to ρ. Instead, a monitor of downstream congestion should measure the moving average of the rate h with a long enough time constant to smooth it. This should bring h within the range:

$$h \in [-1, \varepsilon] \quad 0 \leq \varepsilon \ll 1.$$

Then the moving average of ρ can safely be derived from h using Eqn (3).

$$\rho_j = 1 - 1/(1 - h_j)$$

$$\Rightarrow \rho \in [-\varepsilon, 1/2]$$

Note that re-ECN may not be able to express downstream path congestion if ρ>½. This is a consequence of the limit on $z_0$ in Eqn (2). However, the rate of CE marking, u can express the full range of congestion [0, 1]. So, for safety, $u_n$, should be used by the source for congestion control (as we do below) while h and therefore ρ should merely be used to declare downstream congestion to the network. Then downstream congestion above 50% will still be reacted to correctly by a transport based on re-ECN, but sustained operation above 50% congestion will mislead the network into thinking that the source is dishonestly understating congestion. If the wider re-feedback incentive framework were in place (outside the scope of this discussion), the network would then drop packets. But if there were sustained 50% explicit congestion notification, the network would already be dropping significant volumes of packets.

Implementation Example #1

End to End TCP/IP with Re-ECN

End to End Arrangement

In general, re-feedback enables the network to signal to each node on a data path one or more characteristic metrics of the downstream path. Here we focus solely on congestion notification. FIG. 2 shows the arrangement of the main feedback-related functions of a general end to end arrangement of re-feedback. Relay 0 and the source may be the same node.

When the first packet of a new flow is generated, the source initiates the re-feedback signal. Then a three-stage feedback loop begins:

each relay's contribution to the metric $m_i$ is combined with the re-feedback signal $h_i$, the re-feedback signal at the destination $h_n$, is echoed from the destination back to the source, the source updates the initial value of the re-feedback signal $h_0$ in subsequent packets.

Furthermore any node on the path, including each end host, may monitor the value of the metrics, e.g. for adapting the data rate at the source or for controlling the flowing traffic at the routing nodes.

While accumulation is performed at the network layer, all other functions are performed at the transport layer.

We focus here on the application of re-feedback to TCP rate control. Other transport protocols would need similar functions to make good use of re-feedback, although the exact implementation would differ.

FIG. 3 outlines a standard TCP socket at the source of a half connection. FIG. 4 shows how a re-feedback TCP socket differs. For simplicity we ignore all the information exchange relevant to the other half-connection, and the set-up and tear-down considerations.

Current TCP Implementation

In standard TCP, two information flows are happening asynchronously. On the right-hand side, an application sends data to the socket which requests to send (RTS) so many bits (size) to the rate control process. As soon as it is appropriate, the rate control engine clears to send (CTS) and returns the sequence number for the TCP packet as well as the Congestion Window Reduced (CWR) flag used by standard ECN. When it is cleared to send, the TCP packetiser forms the relevant request to IP with the IP payload, the value of the ECN field (set to ECT), and other IP flags if relevant.

The other information flow is triggered by the arrival of acknowledgements from the destination of the TCP connection. The ACK reader will extract the information relevant to this half-connection, namely the Echo of the Congestion Experienced bit (ECE) and the acknowledgement number. The rate control process can then adjust the congestion window (cwnd). The only times when both information flows have to be synchronous are when the packetiser requests the rate control process (RTS/CTS loop).

TCP Modifications for Re-ECN

With re-feedback the general circulation of the information flows remains similar to what it is with TCP. The only addition is that of the path capture function after the ACK reader, whose role is to maintain the value $z_0$ which is the characterisation of recent congestion on the path used to determine the rate at which ECT(0) is set in outgoing packets.

When the application requests the TCP socket to send data, almost everything happens as with standard TCP. The only difference is that the rate control thread will send the CTS signal to the path capture function so that it determines which ECT value to set in the next packet.

Initialisation

The rate of ECT(0) set by the source, $z_0$, depends on the rate of ECE fed back from the receiver, $u_n$, which by Eqn (2) is $$u_n \leq 1/2: \quad z_0 = u_n/(1-u_n)$$
$$u_n > 1/2: \quad = 1.$$

At the start of a flow, in the absence of any feedback, $u_n$ may initially be set using some estimate of the likely path ahead. But assuming no recent knowledge of the new path is available, a safe policy will be to initialise $u_n=1$, implying $z_0=1$. That is, the initial packets of a flow should all be sent with ECT(0) set.

Combining

Each relay characterises its local congestion as $m_i$, then marks incoming packets to CE with probability $m_i$. For instance, $m_i$ may be the probability $\rho_a$ generated by the RED algorithm by the egress interface servicing the packet using its current exponentially weighted moving average queue length. In other words, relays mark the CE code-point no different from today.

So, at each relay, the rate of CE marking of outgoing packets will depend both on the incoming CE rate and on current congestion by the combining function $$u_{i+1}=1-(1-u_i)(1-m_i).$$

The rate of occurrence of the ECT(0) code-point will consequently be modified as $$z_{i+1}=z_i(1-m_i).$$

So the virtual header field will be modified as $$h_{i+1} = u_{i+1} - z_{i+1}$$
$$\Rightarrow = 1 - (1-h_j)(1-m_i).$$

Echo

With reference to FIG. 7, echo may be done in one of the following two manners:

1. As for standard ECN marks, a CE packet is acknowledged by a TCP acknowledgment with the echo congestion experienced (ECE) flag set. The ECE flag will be set until the destination receives a packet from the source with the CWR bit set. In effect, ECE flags should be set for roughly a round-trip time.

2. An alternative solution is to only echo marks in the first acknowledgment back.

FIG. 7 illustrates the first case: the sender sends six packets (plain arrows) which are acknowledged on receipt (dashed arrows). On the left the value of the CWR bit in each packet is shown, while on the right the value of the ECE bit in each acknowledgment is shown. At first CWR and ECE are set to zero. When a congestion mark occurs (ECN field set to "CE" codepoint), the sender will start sending back all acknowledgments with ECE set to 1. As soon as the receiver gets an acknowledgment with ECE=1, it will educe its congestion window (hence only two packets are sent at that point) and it will signal CWR=1 to the receiver. The receiver will reset ECE to zero as soon as it receives CWR=1. This whole sequence should be interpreted as a single echo for the purpose of the mechanism described below.

Monitoring

Monitoring downstream congestion from node j requires deriving $h_j=u_j-z_j$ from the difference in the rates of the two code-points CE and ECT(0) in the data stream. Depending on the purpose of monitoring, separate values may be required for different granularities of traffic, e.g. for each flow (e.g. required by the TCP source), for all packets to a destination IP address or subnet, for all packets of a class, or simply for all packets. Whatever monitoring granularity is chosen, the most efficient monitoring algorithm will be an exponentially weighted moving average, with a smoothing constant $\psi$ that determines how smoothed the value is (smaller values are smoother). Every ECT packet the algorithm would run as follows:

if CE F=1
if ECT(0) F=−1
if ECT(1) F=0

$$h_j \leftarrow \psi F + (1-\psi)h_j$$

from Eqn (3) $\rho_j = 1 - 1/(1-h_j)$
Update

The ECE marks that echo congestion experienced in TCP acknowledgements should be used directly to drive the TCP rate reaction as they conform to the ECN standard specification.

The principal difference with this re-ECN is the need to set a rate $z_0$ of ECT(0) in sent packets. FIG. 4 shows that the path capture function maintains a moving value of $u_n$, which we will describe below. Then, whenever the packetiser has new data to send, it sends a request to send (RTS) to the rate controller. Once the congestion window is sufficient to allow new data to be sent, the rate controller asks the path capture function whether ECT(0) should be set. The path capture function sends the clear to send (CTS) response to the packetiser using an implementation of Equation (2) to determine which ECT code-point should be set.

A self-clocked algorithm is proposed below. The main mechanism consists of re-inserting an ECE mark as an ECT(0) codepoint in the next packet to be sent—which we call a primary ECT(0) packet. Furthermore, if ECE echoes are received on average every N packets, a correction mechanism consists of inserting an extra ECT(0) codepoint—in a "secondary" ECT(0) packet—every (N−1) ECE echoes.

This effectively implements Equation (2) because the expected average for N is 1/m, and Equation (2) gives the frequency at which ECT(0) packets should be sent as 1/(N−1). The frequency of primary ECT(0) packets is only 1/N. The frequency of secondary ECT(0) packets is 1/(N·(N−1)), which compensates exactly for the discrepancy:

Below is pseudo-code for the implementation of this mechanism, where:
ECT0_buffer tracks the number of packets yet to be sent;
i tracks the number of packets acknowledged since last primary ECE echo;
N is an estimation of the average number of packets between two ECE echoes;
R is a counter for the number of primary ECT(0) packets sent since the last secondary ECT(0) packet.
When a new ACK is received:

```
. i++
. if ("ECE field is set to 1")
..... increment(ECT0_buffer)
..... N = EWNA (N, i)
..... i=0
..... R++
..... if R ≧ (N − 1)
.......... increment(ECT0_buffer)
.......... R=0
```

When the rate control module clears a packet for sending:

```
. if ECT0_buffer >0
..... ECT0--
..... set ECT(0)
. else
..... set ECT(1)
```

An alternative implementation of Equation (2) is given in the code below:

```
. if u_n ≦ (1 − u_n).rand[0,1]
..... set ECT(1)
. else
..... set ECT(0)
``` where $u_n$ is the rate of TCP acknowledgements arriving at the source that contain echo congestion experienced (ECE). On receiving an acknowledgement, the ack reader tells the path capture function. Then the exponentially weighted moving average (EWMA) $u_n$ is updated depending on whether ECE is flagged
if ECE $\{u_n \leftarrow (1-\alpha)u_n + \alpha\}$
else $\{u_n \leftarrow (1-\alpha)u_n\}$ The "ack" is then passed to the rate controller. Note that when an ack arrives at the rate controller, it will often increase the congestion window, releasing the packetiser to send some more segments. This is why we pass the ack to the rate controller after the path capture function updates $u_n$, so the ECT code-points of any new segments will take account of the latest path information arriving with the ack.

Packets sent more than a few round trips times ago should not contribute to the EWMA, as the path knowledge they picked up will be stale. Therefore, the EWMA smoothing weight a should preferably be re-calculated each packet to ensure the time constant reflects the number of packets in flight f, which can be calculated by the source TCP. We suggest:

$$\alpha = 1/(1+f)$$

The use of (1+f) allows the ack just arrived to be taken into account. Strictly, f should be the number of packets that were in flight when the packet that caused the current ack was sent.

For both implementations, whenever any part of the TCP algorithm deems that a loss has occurred, whether through three duplicate acknowledgements, a time-out or whatever, the path capture function behaves as if the last acknowledgment had been received with ECE set.

As an alternative for the update mechanism, ECN echoes can be re-inserted immediately as ECT[1] in the TOP flow, which implements Eqn (2a). This can be done by incrementing a counter every time an acknowledgement is received with the ECE bit set. The CTS response will set the ECN field to ECT[0] whenever the counter is null, and to ECT[1] whenever it is at least. In the latter case, the counter is immediately decremented by one. Whenever a congestion event is detected by other means than an ECE bit, the counter should also be incremented.

Implementation Example #2

Edge to Edge Guaranteed QoS Synthesis with Re-ECN

The Guaranteed QoS Synthesiser (without Re-ECN)

Guaranteed QoS Synthesis is a technology that enables network operators to provide per-flow guaranteed quality of service (QoS) to inelastic traffic across single or interconnected IP networks, with the simplicity but not the cost of over-provisioning. The guaranteed QoS synthesiser (GQS) has been described in a number of BT internal reports, but none are yet published.

GQS uses three standard Internet protocols, but all in a different arrangement to that in which they were originally designed:
- A reservation signalling protocol such as RSVP [RFC2205] is used, but in a scalable arrangement unlike the original Integrated Services Architecture [RFC1633];
- Differentiated services code points (DSCP) [RFC2474] are used, but not the complexity of service level agreement handling in the DiffServ architecture [RFC2475];
- Explicit congestion notification (ECN) [RFC3168] is used, but not in its original end-to-end congestion control architecture.

In all cases, we have not contravened the standards, because the architectures that we avoid using are merely informational—it is the protocols that are standardised.

FIG. 5 shows a 'ring-fence' of GQS gateways surrounding a number of core network domains and forming a GQS region. The figure shows each network partitioned into two logically distinct layers. This represents the distinction between traffic that is protected by a bandwidth reservation—guaranteed (G), and traffic that is not—non-guaranteed (N). GQS gateways do not require capacity within the ring to be hard partitioned between the two classes of traffic. The proportion of each type of traffic can flex with demand, but once a guaranteed flow has been accepted, the capacity assigned to it is assured, but without any reservation mechanism on intra-region routers within the ring.

A few data flows are shown entering or leaving each gateway, representing its attached access network. For clarity these flows are not shown crossing the core, except for one, which is highlighted along its length. On the outer, access network side of each gateway, the solution appears to be traditional, using whatever QoS technology is chosen for the access network (e.g. bandwidth brokers or IntServ).

GQS gateways should be placed at points in the network where there is sufficient statistical multiplexing of traffic, such that the addition of one flow cannot take the system from zero congestion to overload. Outside the ring of gateways, less scalable reservation technology can be used, due to the lower traffic volume. GQS is intended only for scalability of core networks including also larger access networks.

How end-to-end QoS reservation signals are handled in the access network is unimportant, as GQS can cope with any model, but to make the description concrete, we assume the reservation protocol (RSVP) is used as the end-to-end control path mechanism. In particular, the ring-fence of GQS gateways are enabled to intercept and process RSVP QoS messages, whereas intra-region elements within the ring are not (i.e. RSVP messages are opaque to these elements and hence silently treated as data packets in the interior).

The end-to-end transactional model is the traditional one of RSVP. The data sender prepares routers along the data path by announcing the flow specification it intends to send and each hop passing its address to the next hop (not shown). But within a GQS region, because only the gateways intercept RSVP messages, RSVP treats the whole region as a single hop. Even borders between different operators do not process signalling messages, as the single RSVP hop may deliberately encompass multiple operators.

After reaching the data destination, a signalling response returns back along the same set of routers (represented in FIG. 5 by the dashed arrow). Again, because all intra-region routers cannot see RSVP, the whole region appears as a single reservation hop, with the egress gateway sending its response straight to the address given earlier by the ingress gateway. If the end-to-end RSVP signalling exchange completes successfully, reservation state is added to each gateway so that data path processing can commence.

The various data path processing steps applied to this flow are represented by circled numbers. In access network equipment, step (1) represents traditional policing of the data to keep it within the reservation. The GQS gateways keep guarantees by only allowing data matching an accepted reservation to be tagged with a differentiated services code-point chosen to represent 'guaranteed', denoted 'G' in the figure. Any traffic not under a reservation, including traffic with a bit rate in excess of that reserved for it, is re-classified (i.e. downgraded) to another class of service, denoted by 'N', before being allowed into the region by the policing mechanism (step 2). This is just standard traffic policing and re-classification—no different from that used in DiffServ except that all guaranteed traffic is also marked as ECN-capable (otherwise it would be dropped rather than marked by interior routers in the event of congestion onset).

Note that unlike in the DiffServ architecture, an amount of capacity on routers within the ring is not configured for guaranteed priority. And the acceptance of a new traffic contract (a reservation) does not depend on a calculation of whether sufficient capacity has been configured for the class.

In the data path of all intra-region elements, guaranteed traffic is given strict priority over other classes and allowed to pre-empt the place of other traffic in shared buffers if they are too full. If any intra-region router experiences congestion it will mark a proportion of all the packets it forwards with ECN (step 3). Note that ECN marking has nothing to do with flows, of which intra-region routers are unaware. On reaching the egress GQS gateway, the fraction of ECN marks in traffic arriving from each ingress gateway is separately metered (4). Each egress GQS gateway maintains the moving average of this fraction for the aggregate of traffic from each upstream GQS gateway as long as at least one reservation is active. In the case of RSVP, whenever a reservation request is made, the congestion report is piggy-backed on the response to the request, using RSVP's capability for carrying opaque objects. In this way, the congestion report is fed back to the ingress, where admission can be controlled.

Upstream admission control (step 2) is determined by this congestion metric. This arrangement is called distributed measurement-based admission control (DMBAC), because previous MBAC schemes have been confined to a single node. The ingress gateway will deny a new reservation request if the ECN fraction of traffic reported on the path to the relevant downstream gateway exceeds a fixed threshold.

If a new request arrives between a pair of gateways where no other active reservations are in place, the ingress gateway sends sufficient probe packets across the ring to the egress in order to establish the ECN fraction for that path in parallel to the downstream reservation path message. On its return, the reservation request picks up the congestion report, waiting if necessary, and feeds it back to the ingress gateway where admission control continues as before.

The Guaranteed QoS Synthesiser with re-ECN

For brevity we term this scenario re-GQS.

Re-GQS is identical to GQS in all respects but one. Reservation signals are identical, and the congestion reports they carry are identical. The only difference is that re-ECN rather than ECN is used across the GQS region. The advantage is that the downstream congestion metric can be measured at inter-domain boundaries, whereas only upstream congestion is measurable with ECN. Once downstream congestion is measurable at each inter-domain boundary each downstream neighbour can use it to police the behaviour of its upstream neighbour. So, if an upstream network is accepting too many reservations, despite congestion in a downstream network, a high level of downstream congestion will be measurable at the border with that network.

A simple way to incentivise upstream networks not to cheat is to charge them in proportion to the downstream congestion they cause. Once re-ECN makes downstream congestion visible at inter-domain boundaries, a simple counter can be used to count the level of downstream congestion crossing the boundary over an accounting period (say a month). Then the downstream neighbour can charge its upstream neighbour in proportion to this counter. This provides the correct incentives to prevent cheating, but previously no mechanism was available to allow the charge to be made in the right direction. Previously, because congestion notification increased in the downstream direction, it was only possible to for the upstream neighbour to charge its downstream neighbour. This direction of payment was the wrong way round to incentivise upstream networks to behave.

As with the TCP example above, re-ECN is used identically to ECN except when the ingress gateway turns on ECT, it sets the ECT(0) code-point at a rate $z_0$ that reflects the congestion $u_0$ appearing at the destination, using Eqn (2). Otherwise it sets ECT(1). In other respects, re-ECN is like ECN. Intra-region routers mark congestion experienced (CE) no differently to before. Because the GQS is only concerned with congestion between the gateways—edge to edge, not end to end—the destination for the purposes of re-GQS is the egress GQS gateway. The congestion report the egress gateway attaches to a reservation request records the moving average of CE packets relative to the total packets in the guaranteed class. So, when the ingress gateway sends a reservation request, it receives back a response carrying a congestion report effectively already containing the fraction of CE $u_n$. This is effectively equivalent to the part of the TCP sender's update function where it maintained a moving average of ECE from TCP acks. But in the GQS case, the egress gateway maintains the moving average and only sends the current value whenever a reservation request is returned to the ingress. In fact, RSVP refreshes reservation requests (typically every 30 secs). If a node doesn't see a refresh after a certain time, it assumes the reservation has been cleared down, but the clear down message was lost, so it clears down the reservation. So the egress gateway can update the congestion report with the latest moving average value at least every refresh. Also, if multiple reservations are in progress between a pair of gateways, each reservation request and each refresh allows the egress to update the ingress with the latest moving average. The same moving average is relevant to all reservations between the pair, so any one reservation can use the moving average reported for another between the same pair of gateways.

The ingress gateway stores the latest congestion report $u_n$ in a table against the IP address of each egress gateway from which the report came. Every time a more recent report arrives from an egress gateway, it simply replaces the previous one. The ingress gateway also stores the IP address of the next downstream hop against each flow in its table of active flow reservations. It can do this because the RSVP response to the ingress from the egress carries the IP address of the downstream RSVP hop it came from (the egress gateway).

As each packet arrives, the ingress gateway must already look up the packet's flow identifiers in its table of active reserved flows. It does this to find which token bucket policer should account for the packet. At the same time it can lookup the IP address of the next RSVP hop in the same row of the table. It can then lookup this IP address in the table of active egress gateways to find the latest congestion report $u_n$ from that gateway. Once it has $u_n$, it can run the same algorithm as the TCP sender did to determine which ECT code-point to set:

if $u_n \leq (1-u_n)\mathrm{rand}[0,1]\{(\mathrm{set\ ECT}(1)\}$
else {set ECT(0)}, Then guaranteed traffic between the gateways will carry the virtual header h, as the difference between the CE marking rate u and ECT(0) z. So monitors on the path can determine downstream congestion $\rho$ in exactly the same way as was already described above under the monitoring function in the TCP example.

In order to implement monthly downstream congestion charging at an inter-domain boundary j which was the original motivation for introducing re-ECN to the GQS, the following simple mechanism would suffice. Three separate counters for the volume (in bytes) of packets marked CE, ECT(0) and ECT(1) crossing the boundary should be maintained. We shall call the first two $U_j$ and $Z_j$ and we shall call the sum of them all $V_j$, that is the volume of all ECN-capable traffic.

Then from Eqn (1): $h_j = (U_j - Z_j)/V_j$.
From Eqn (3): $\rho_j = 1 - 1/(1-h_j)$ So if the agreed price of congested volume between the networks is $\lambda$, the monthly charge that the upstream neighbour pays the downstream should be simply $$\lambda \rho_j V_j$$

Implementation Example #3

Generalised Superimposed Coding

Consider a multibit field of length N carrying information that can take any of R values. This leaves $M = 2^N - R$ unused values that we can re-use in order to carry extra information.

In each packet, the flow is initialised at the source and possibly updated at each relay (for instance the downstream delay may be decremented), which constitutes the basic use of the field. An intermediate node can therefore monitor the dynamic evolution of the value coded in this field.

We propose to use some of the unused M values as alert (or "alarm") codepoints so that, whenever needed the field is over-written with the alert codepoint (cf. the CE field in ECN). An intermediate node can monitor this and count the frequency of alerts in order to synthesise another path characteristic.

Re-ECN results from N=2, with the alert coded as CE. The source encodes the end-to-end congestion metric by setting the ECN field to ECT(0) in a proportionate number of packets (by approximately echoing any ECE flag signalled by the source), while others are set to ECT(1). An intermediate node can monitor the end-to-end congestion metric as the ratio of ECT(0) to ECT(*). It can also monitor the upstream congestion (as the rate of CE alerts). And an estimate for the downstream congestion as the difference between the two.

This works especially well for small low alert frequencies (cf. low rates of congestion marking).

With reference to FIG. 8, we consider a generalisation of Re-ECN and the mechanism described in relation to FIG. 2. The mechanism may relate to metrics indicative of congestion, or may relate to metrics of other types. The field used may have only 2 bits, such as the ECN field, or may have a greater number of bits, N, where the primary usage of the field is to transfer information from the source and/or network nodes to downstream nodes and/or the destination. For that purpose, the representation of the field uses a set $S_p$ of the N-bit codepoints. When the cardinality card($S_p$)<N, it is possible to use the extra codepoints as again from the source and/or network nodes to downstream nodes and/or the destination. We define the set of alarm codepoints as $S_a=\{A_1, \ldots A_k\}$ with k+card($S_p$)<N. An alarm $A_j$ gets priority over any alarm $A_i$, where i<j, and any primary codepoint. In other words, a network node can overwrite a primary codepoint or an alarm codepoint with an alarm codepoint of higher priority.

Referring to FIG. 8, the functions at each node may be as follows:

The source initialises or updates the value to which it sets the field in the header of the packets it sends.

The network nodes or relays may add their local contribution to, or otherwise combine their local contribution with, the metric The source or any network node may overwrite the header field with a higher priority codepoint.

Any node may monitor the value of the primary field and/or the presence and/or frequency of the alarm codepoints.

The destination echoes the value of the header field and may combine its own contribution or overwrite it to a higher priority codepoint.

By virtue of the above, embodiments of the invention enable the design of a mechanism allowing the multiple use of a single multibit field to transmit a primary continuous information to nodes on the path of a flow, as well as secondary information encoded in the frequency of exception codepoints.

REFERENCES

[RFC2205] Braden (Ed.), R., L. Zhang, S. Berson, S. Herzog and S. Jamin, "Resource ReSerVation Protocol (RSVP)—Version 1 Functional Specification," Internet Engineering Task Force Request for comments 2205 URL: http://www.ietf.org/rfc/rfc2205.txt (September 1997)

[RFC1633] R. Braden, D. Clark, and S. Shenker. Integrated services in the Internet architecture: an overview. Request for comments 1633, Internet Engineering Task Force, URL: rfc1633.txt, June 1994.

[RFC2474] K. Nichols, S. Blake, F. Baker, and D. Black. Definition of the differentiated services field (DS field) in the IPv4 and IPv6 headers. Request for comments 2474, Internet Engineering Task Force, URL: rfc2474.txt, December 1998.

[RFC2475] S. Blake, D. Black, M. Carlson, E. Davies, Z. Wang and W. Weiss "An Architecture for Differentiated Services" Internet Engineering Task Force Request for comments 2475, URL: http://www.ietf.org/rfc/rfc2475.txt (December 1998)

[RFC3168] K. K. Ramakrishnan, Sally Floyd and David Black, "The Addition of Explicit Congestion Notification (ECN) to IP," Internet Engineering Task Force Request for comments RFC3168, URL: http://www.ietf.org/rfc/rfc3168.txt (September, 2001)

GENERAL SUMMARY OF ADVANTAGES OF EMBODIMENTS OF THE PRESENT INVENTION

Preferred embodiments of the present invention make the earlier re-feedback concept deployable for the Internet. Making the re-feedback concept deployable is of great importance in relation to re-balancing the power balance on the Internet so that network operators can police economically viable rules for allocation of capacity.

For instance, many internet users simply download Voice over IP (VoIP) products that work by being unresponsive to congestion, effectively stealing capacity from other users during congestion without needing to pay towards a tariff that recovers the investment needed for that peak hour capacity. The same will be true of other products, such as interactive video. With Voice over IP products, it is presently too easy for some users to steal what they need undetected, rather than pay for it.

By allowing for the implementation of the re-feedback concept, embodiments of the present invention will also push back the responsibility for flooding attacks to the networks that allow them to be launched, and it will allow other service providers to automatically throttle down links from machines that persistently fill the capacity of the network, such as hosts taken over by worms (called "zombie hosts").

Economists generally agree that congestion information is necessary to optimise the use of networks. And with data networks, this information is needed extremely frequently. But with the current Internet's feedback architecture, even if rules were set to allocate capacity fairly based on congestion, they would not be enforceable, because the network operator has no access to the necessary downstream congestion information. Alternative, enforceable rules are therefore used, but only by using other metrics (such as volume caps) that are poor alternatives to the metric that all economists agree really enables fair sharing of capacity: downstream congestion.

What is claimed is:

1. A machine-implemented method of encoding information indicative of measurements of a first and a second characteristic of a network, using a plurality of messages traversing a plurality of nodes in a network, said messages each having a header associated therewith comprising one or more fields, at least a selected portion of each header providing at least three codepoints; said method comprising:

using at least one programmed processor at a network node on a path through the network to assign a codepoint from a first set of codepoints of the selected portion in headers associated with a first proportion of said plurality of messages traveling in one direction along a network path thereby encoding information indicative of a measurement of said first characteristic of the network, and using at least one programmed processor at a different network node on said path through the network to assign a codepoint from a second set of codepoints of the selected portion in headers associated with a second proportion of said plurality of messages traveling in said one direction along said network path thereby encoding information indicative of a measurement of said second characteristic of the network, wherein:

said first proportion is determined in dependence on, and is thereby indicative of, the measurement of said first characteristic of the network;

said second proportion is determined in dependence on, and is thereby indicative of, the measurement of said second characteristic of the network; and at least one of said first and second network characteristics is variable along said path through the network independently of the other of said network characteristics.

2. A method according to claim 1 wherein said selected portion is an n-bit field, where n is greater than 1.

3. A method according to claim 2 wherein said n-bit field is a 2-bit field.

4. A method according to claim 1, wherein said selected portion comprises an existing field in the header associated with each message.

5. A method according to claim 1, wherein said selected portion comprises a contiguous subset of bits selected from the header associated with each message.

6. A method according to claim 1, wherein said selected portion comprises a non-contiguous subset of bits selected from the header associated with each message.

7. A method according to claim 1, wherein said selected portion comprises a Congestion Notification field.

8. A method according to claim 1, wherein said selected portion comprises the Explicit Congestion Notification field.

9. A method according to claim 1, wherein said information comprises at least one value.

10. A method according to claim 1, wherein at least one of said network characteristics is a dynamic characteristic.

11. A method according to claim 1, wherein said first and second network characteristics are dynamic characteristics.

12. A method according to claim 1, wherein at least one of said network characteristics relates to congestion in said network.

13. A method according to claim 1, wherein at least one of said network characteristics relates to a measure of end-to-end congestion on a path in said network.

14. A method according to claim 13, wherein said network characteristic relating to end-to-end path congestion is dynamic in the sense that it may vary after a period corresponding to a round-trip time of a message traversing said path.

15. A method according to claim 1, wherein at least one of said network characteristics relates to a measure of upstream congestion on a path in said network.

16. A method according to claim 15, wherein said network characteristic relating to upstream congestion is dynamic in the sense that it may vary during a period corresponding to a round-trip time of a message traversing said path.

17. A method according to claim 15, wherein said selected portion comprises the Explicit Congestion Notification field, and wherein a codepoint CE indicative of "Congestion Experienced" is assigned to the Explicit Congestion Notification field in the headers associated with a first proportion of messages in dependence on said measure of upstream congestion.

18. A method according to claim 1, further comprising a step of changing at least one of said first and second proportions in response to an indication from a receiver of a message that said information requires updating, said changing step comprising:
selecting a proportion of messages from a plurality of subsequently-sent messages, said proportion being dependent on a characteristic of an indication from said receiver;
assigning codepoints to said selected messages such as to cause said information to be updated.

19. A method according to claim 18 wherein said selected portion comprises the Explicit Congestion Notification field, and wherein said indication comprises a "Congestion Experienced" notification, and said step of selecting comprises selecting a message subsequent to receipt of said "Congestion Experienced" notification.

20. A method according to claim 18 wherein said selected portion comprises the Explicit Congestion Notification field, and wherein said indication comprises a plurality of echoes of a "Congestion Experienced" notification, and said step of selecting comprises determining an estimate for the number N of messages acknowledged between receipt of two successive echoes and selecting one message for approximately every N−1 messages acknowledged.

21. A method according to claim 20, wherein said estimate is a moving average and said step of selecting consists of:
selecting one message for every echo received; and selecting one extra message for every N−1 echoes received.

22. A method according to claim 1, wherein one or both of said sets of codepoints consists of one codepoint.

23. A method according to claim 1 for performing the stateless extraction of data from a field in a packet over multiple packets whereby to communicate more than one signal at once.

24. A method according to claim 23, further comprising superposition of the results of said stateless extraction of data by addition or subtraction.

25. A method according to claim 1, at least one of said steps of assigning codepoints being performed by a node in said network when sending messages on a path traversing a plurality of nodes in the network.

26. A method according to claim 1, at least one of said steps of assigning codepoints being performed by a node in said network when forwarding messages on a path traversing a plurality of nodes in the network.

27. A method according to claim 1, wherein said method of encoding information in respect of said first and second network characteristics involves assigning codepoints in headers accessible in the same layer.

28. A method according to claim 1, wherein said first and second network characteristics are network performance characteristics.

29. A machine-implemented method according to claim 1, wherein said plurality of messages are all traversing downstream via said plurality of nodes in the network.

30. Apparatus for encoding information indicative of measurements of a first and a second characteristic of a network in a plurality of messages traversing a plurality of nodes in a network, said messages each having a header associated therewith comprising one or more fields, at least a selected portion of each header providing at least three codepoints, said apparatus comprising:
at least one programmed processor at a network node on a path through the network configured to assign a codepoint from a first set of codepoints of the selected portion in headers associated with a first proportion of said plurality of messages traveling in one direction along a network path thereby encoding information indicative of a measurement of said first characteristic of the network, and
at least one programmed processor at a different network node on said path through the network configured to assign a codepoint from a second set of codepoints of the selected portion in headers associated with a second proportion of said plurality of messages traveling in said one direction along said network path thereby encoding information indicative of a measurement of said second characteristic of the network,
wherein:
said first proportion is determined in dependence on, and is thereby indicative of, the measurement of said first characteristic of the network;
said second proportion is determined in dependence on, and is thereby indicative of, the measurement of said second characteristic of the network; and
at least one of said first and second network characteristics is variable along said path through the network independently of the other of said network characteristics.

31. Apparatus according to claim 30, wherein said plurality of messages are all traversing downstream via said plurality of nodes in the network.

* * * * *

UNITED STATES PATENT AND TRADEMARK OFFICE
CERTIFICATE OF CORRECTION

PATENT NO. : 8,498,210 B2  Page 1 of 1
APPLICATION NO. : 11/795948
DATED : July 30, 2013
INVENTOR(S) : Briscoe et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 853 days.

Signed and Sealed this
Fifteenth Day of September, 2015

Michelle K. Lee
*Director of the United States Patent and Trademark Office*